United States Patent
Paz et al.

(10) Patent No.: US 12,389,351 B2
(45) Date of Patent: Aug. 12, 2025

(54) SECONDARY CELL SYNCHRONIZATION

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/933,303

(22) Filed: Sep. 19, 2022

(65) Prior Publication Data

US 2024/0098663 A1 Mar. 21, 2024

(51) Int. Cl.
*H04W 56/00* (2009.01)
*H04L 5/00* (2006.01)

(52) U.S. Cl.
CPC ....... *H04W 56/0015* (2013.01); *H04L 5/0051* (2013.01)

(58) Field of Classification Search
CPC .......... H04W 56/0015; H04L 5/0051
See application file for complete search history.

(56) References Cited

U.S. PATENT DOCUMENTS

| | | | |
|---|---|---|---|
| 10,039,067 B2* | 7/2018 | Chang | H04W 72/02 |
| 2014/0119253 A1* | 5/2014 | Weng | H04W 72/23 |
| | | | 370/336 |
| 2014/0274030 A1* | 9/2014 | Aminzadeh | H04W 76/19 |
| | | | 455/424 |
| 2016/0073370 A1* | 3/2016 | Axmon | H04W 56/0015 |
| | | | 370/350 |
| 2016/0088533 A1* | 3/2016 | Dinan | H04L 5/14 |
| | | | 370/331 |
| 2018/0359790 A1* | 12/2018 | Ingale | H04W 72/51 |
| 2019/0116585 A1* | 4/2019 | Chakraborty | H04L 5/0048 |

(Continued)

OTHER PUBLICATIONS

CMCC: "Discussion on necessity of frame boundary alignment of NR CA", 3GPP TSG RAN WG1 #98, R1-1908877, 3rd Generation Partnership Project, Mobile Competence Centre, 650, Route Des Lucioles, F-06921 Sophia-Antipolis Cedex, France, vol. RAN WG1, No. Prague, CZ, Aug. 26-Aug. 30, 2019, Aug. 16, 2019, 3 Pages.

(Continued)

*Primary Examiner* — Fahmida S Chowdhury
(74) *Attorney, Agent, or Firm* — Harrity & Harrity LLP / Qualcomm

(57) ABSTRACT

Various aspects of the present disclosure generally relate to wireless communication. In some aspects, a wireless communication device may obtain synchronization with a primary cell of a wireless network. The wireless communication device may receive an indication to activate a secondary cell of the wireless network. The wireless communication device may receive a reference signal (RS) of the secondary cell. The wireless communication device may obtain synchronization with the secondary cell based at least in part on an offset between the RS of the secondary cell and a reference time of the primary cell, the reference time based at least in part on the synchronization with the primary cell. The wireless communication device may communicate via the secondary cell based at least in part on the synchronization with the secondary cell. Numerous other aspects are described.

30 Claims, 14 Drawing Sheets

(56) References Cited

U.S. PATENT DOCUMENTS

| | | | | |
|---|---|---|---|---|
| 2020/0187185 A1* | 6/2020 | Zhu | ...................... | H04J 11/0079 |
| 2021/0211253 A1* | 7/2021 | Jung | ..................... | H04B 7/2646 |
| 2022/0248383 A1* | 8/2022 | Park | ...................... | H04W 72/27 |
| 2022/0279453 A1* | 9/2022 | Dinan | ................. | H04W 52/362 |

OTHER PUBLICATIONS

International Search Report and Written Opinion—PCT/US2023/071346—ISA/EPO—Dec. 5, 2023.

* cited by examiner

SECONDARY CELL SYNCHRONIZATION

FIELD OF THE DISCLOSURE

Aspects of the present disclosure generally relate to wireless communication and to techniques and apparatuses for secondary cell synchronization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include obtaining synchronization with a primary cell (PCell) of a wireless network. The method may include receiving an indication to activate a secondary cell (SCell) of the wireless network. The method may include receiving a reference signal (RS) of the SCell. The method may include obtaining synchronization with the SCell based at least in part on an offset between the RS of the SCell and a reference time of the PCell, the reference time based at least in part on the synchronization with the PCell. The method may include communicating via the SCell based at least in part on the synchronization with the SCell.

Some aspects described herein relate to a method of wireless communication performed by a network node. The method may include transmitting, to a UE synchronization RSs of a PCell of a wireless network, the RSs of the PCell configured to support synchronization with the PCell. The method may include transmitting an indication to activate an SCell of the wireless network. The method may include transmitting RS of the SCell, the RS of the SCell configured to support UE synchronization with the SCell based at least in part on an offset between the RS of the SCell and a reference time of the PCell, the reference time based at least in part on the synchronization with the PCell. The method may include communicating via the SCell based at least in part on the synchronization with the SCell.

Some aspects described herein relate to a wireless communication device for wireless communication. The wireless communication device may include a memory and one or more processors coupled to the memory. The one or more processors may be configured to obtain synchronization with a PCell of a wireless network. The one or more processors may be configured to receive an indication to activate an SCell of the wireless network. The one or more processors may be configured to receive RS of the SCell. The one or more processors may be configured to obtain synchronization with the SCell based at least in part on an offset between the RS of the SCell and a reference time of the PCell, the reference time based at least in part on the synchronization with the PCell. The one or more processors may be configured to communicate via the SCell based at least in part on the synchronization with the SCell.

Some aspects described herein relate to a network node for wireless communication. The network node may include a memory and one or more processors coupled to the memory. The one or more processors may be configured to transmit, to a UE synchronization RSs of a PCell of a wireless network, the RSs of the PCell configured to support synchronization with the PCell. The one or more processors may be configured to transmit an indication to activate an SCell of the wireless network. The one or more processors may be configured to transmit RS of the SCell, the RS of the SCell configured to support UE synchronization with the SCell based at least in part on an offset between the RS of the SCell and a reference time of the PCell, the reference time based at least in part on the synchronization with the PCell. The one or more processors may be configured to communicate via the SCell based at least in part on the synchronization with the SCell.

Some aspects described herein relate to a non-transitory computer-readable medium that stores a set of instructions for wireless communication by a wireless communication device. The set of instructions, when executed by one or more processors of the wireless communication device, may cause the wireless communication device to obtain synchronization with a PCell of a wireless network. The set of instructions, when executed by one or more processors of the wireless communication device, may cause the wireless communication device to receive an indication to activate an SCell of the wireless network. The set of instructions, when executed by one or more processors of the wireless communication device, may cause the wireless communication device to receive RS of the SCell. The set of instructions, when executed by one or more processors of the wireless communication device, may cause the wireless communication device to obtain synchronization with the SCell based at least in part on an offset between the RS of the SCell and a reference time of the PCell, the reference time based at least in part on the synchronization with the PCell. The set of instructions, when executed by one or more processors of the wireless communication device, may cause the wireless communication device to communicate via the SCell based at least in part on the synchronization with the SCell.

Some aspects described herein relate to a non-transitory computer-readable medium that stores a set of instructions for wireless communication by a network node. The set of instructions, when executed by one or more processors of the network node, may cause the network node to transmit, to a UE synchronization RSs of a PCell of a wireless network, the RSs of the PCell configured to support synchronization with the PCell. The set of instructions, when executed by one or more processors of the network node, may cause the network node to transmit an indication to activate an SCell of the wireless network. The set of instructions, when executed by one or more processors of the network node, may cause the network node to transmit RS of the SCell, the RS of the SCell configured to support UE synchronization with the SCell based at least in part on an offset between the RS of the SCell and a reference time of the PCell, the reference time based at least in part on the synchronization with the PCell. The set of instructions, when executed by one or more processors of the network node, may cause the network node to communicate via the SCell based at least in part on the synchronization with the SCell.

Some aspects described herein relate to an apparatus for wireless communication. The apparatus may include means for obtaining synchronization with a PCell of a wireless network. The apparatus may include means for receiving an indication to activate an SCell of the wireless network. The apparatus may include means for receiving RS of the SCell. The apparatus may include means for obtaining synchronization with the SCell based at least in part on an offset between the RS of the SCell and a reference time of the PCell, the reference time based at least in part on the synchronization with the PCell. The apparatus may include means for communicating via the SCell based at least in part on the synchronization with the SCell.

Some aspects described herein relate to an apparatus for wireless communication. The apparatus may include means for transmitting, to a UE synchronization RSs of a PCell of a wireless network, the RSs of the PCell configured to support synchronization with the PCell. The apparatus may include means for transmitting an indication to activate an SCell of the wireless network. The apparatus may include means for transmitting RS of the SCell, the RS of the SCell configured to support UE synchronization with the SCell based at least in part on an offset between the RS of the SCell and a reference time of the PCell, the reference time based at least in part on the synchronization with the PCell. The apparatus may include means for communicating via the SCell based at least in part on the synchronization with the SCell.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
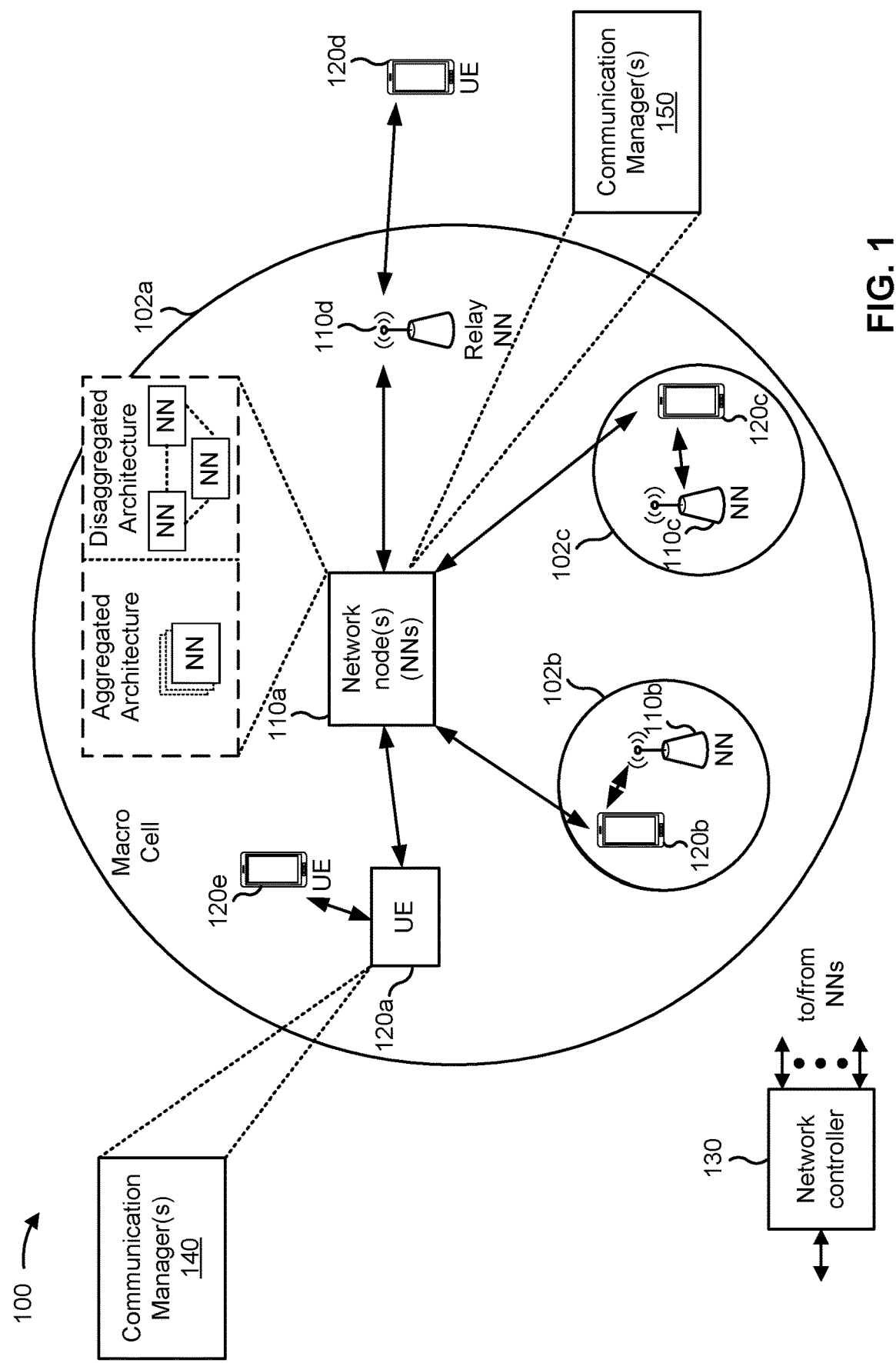
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more Cus, and/or one or more Dus. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges (FRs).

In some aspects, the wireless communication device (e.g., a network node 110, or a UE 120) may include a communication manager 140 or 150. As described in more detail elsewhere herein, the communication manager 140 or 150 may obtain synchronization with a primary cell (PCell) of a wireless network; receive an indication to activate a secondary cell (SCell) of the wireless network; receive a reference signal (RS) of the SCell; obtain synchronization with the SCell based at least in part on an offset between the RS of the SCell and a reference time of the PCell, the reference time based at least in part on the synchronization with the PCell; and communicate via the SCell based at least in part on the synchronization with the SCell. Additionally, or alternatively, the communication manager 140 or 150 may perform one or more other operations described herein.

In some aspects, the network node may include a communication manager 150. As described in more detail elsewhere herein, the communication manager 150 may transmit, to a UE synchronization RSs of a PCell of a wireless network, the RSs of the PCell configured to support synchronization with the PCell; transmit an indication to activate an SCell of the wireless network; transmit RS of the SCell, the RS of the SCell configured to support UE synchronization with the SCell based at least in part on an offset between the RS of the SCell and a reference time of the PCell, the reference time based at least in part on the synchronization with the PCell; and communicate via the SCell based at least in part on the synchronization with the SCell. Additionally, or alternatively, the communication manager 150 may perform one or more other operations described herein.

As indicated above, FIG. 1 is provided as an example. Other examples may differ from what is described with regard to FIG. 1.

Figure 2:
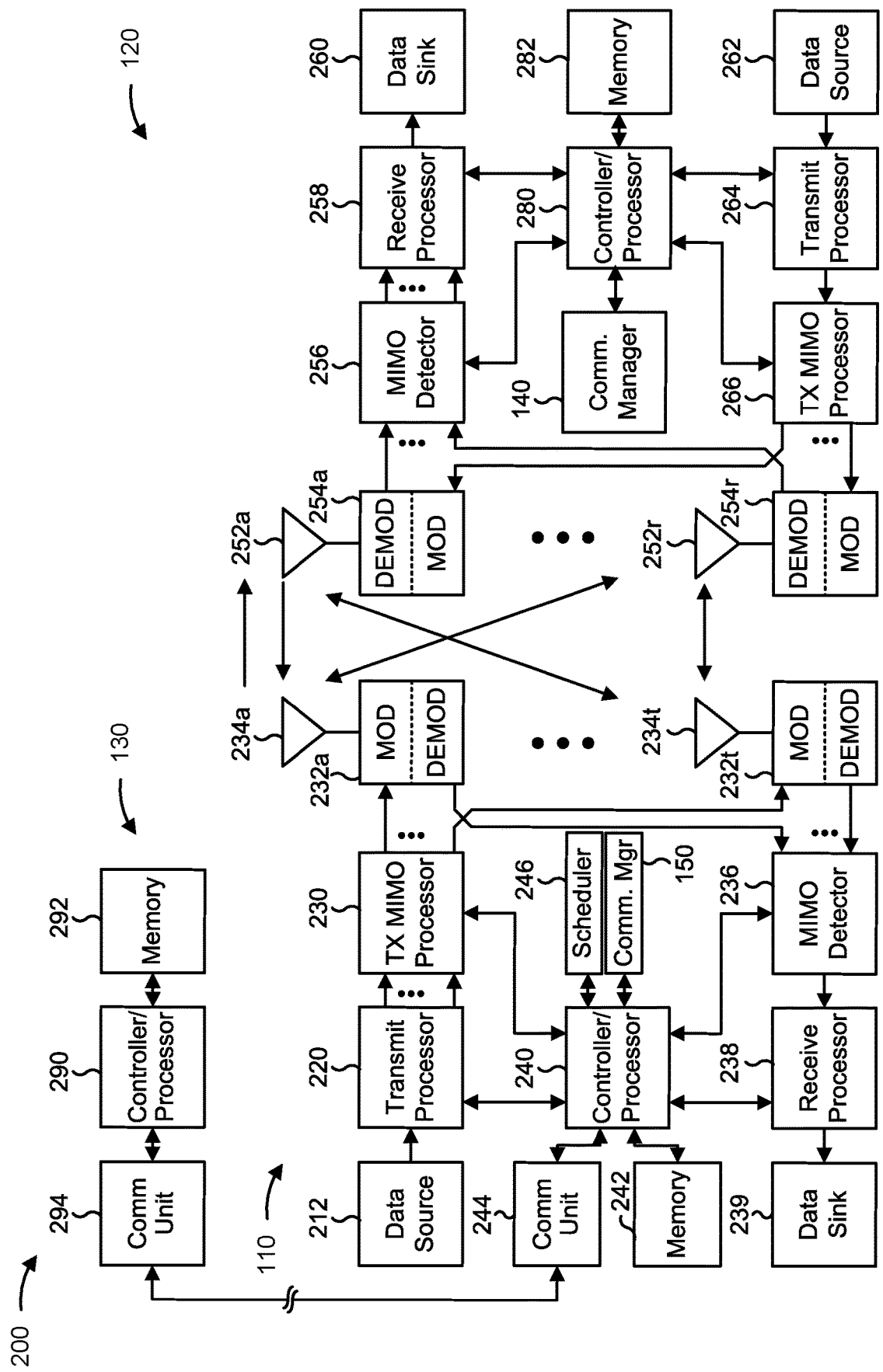
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-14).

The controller/processor 240 of the network node 110, the controller/processor 280 of the UE 120, and/or any other component(s) of FIG. 2 may perform one or more techniques associated with SCell synchronization, as described in more detail elsewhere herein. In some aspects, the wireless communication device described herein is the network node 110 (e.g., a relay node, a forwarding node, or a repeater, among other examples), is included in the network node 110, or includes one or more components of the network node 110 shown in FIG. 2. In some aspects, the wireless communication device described herein is the UE 120, is included in the UE 120, or includes one or more components of the UE 120 shown in FIG. 2.

Figure 11:
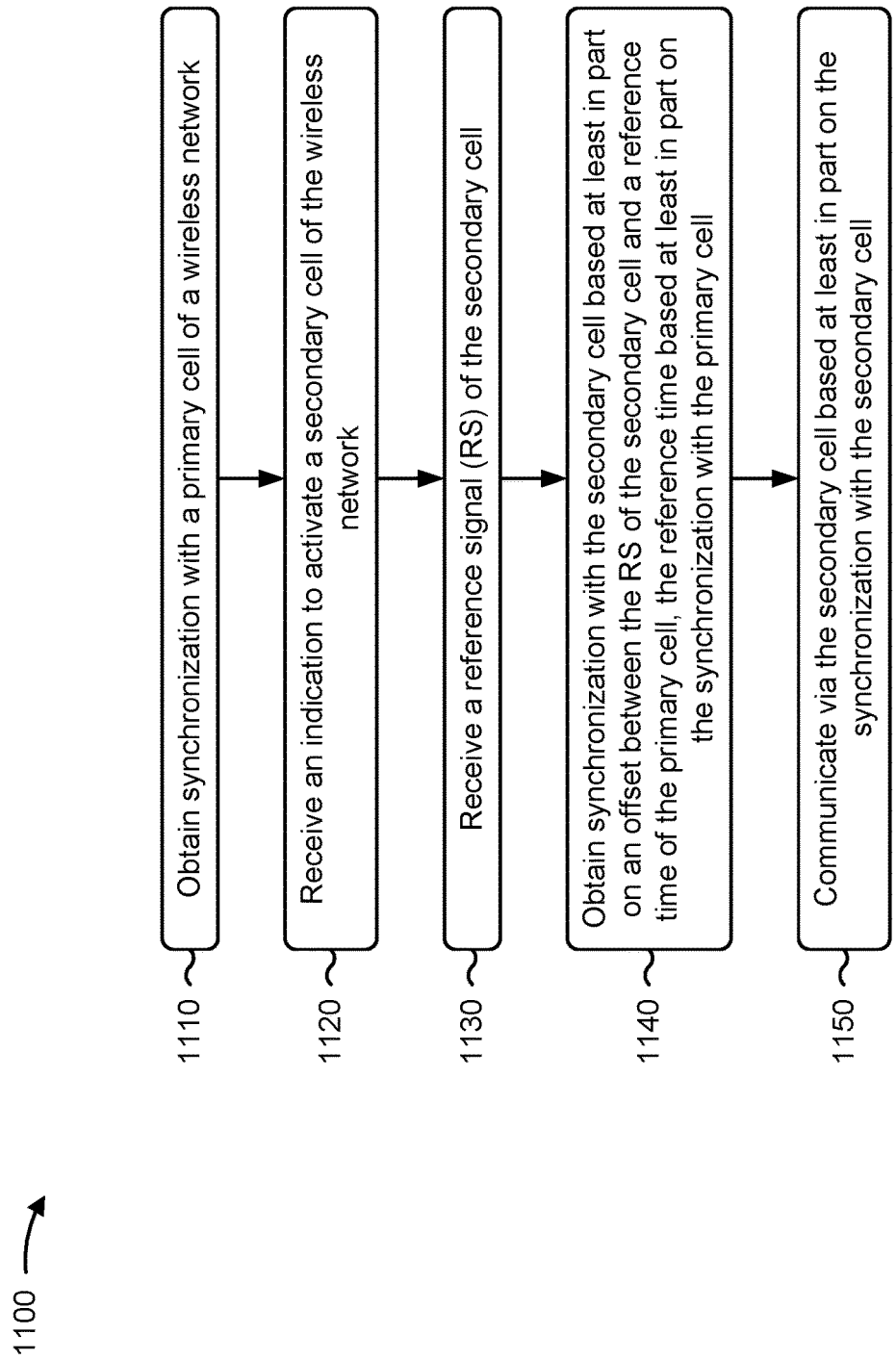
FIG. 11 is a diagram illustrating an example process performed, for example, by a wireless communication device, in accordance with the present disclosure.
Figure 12:
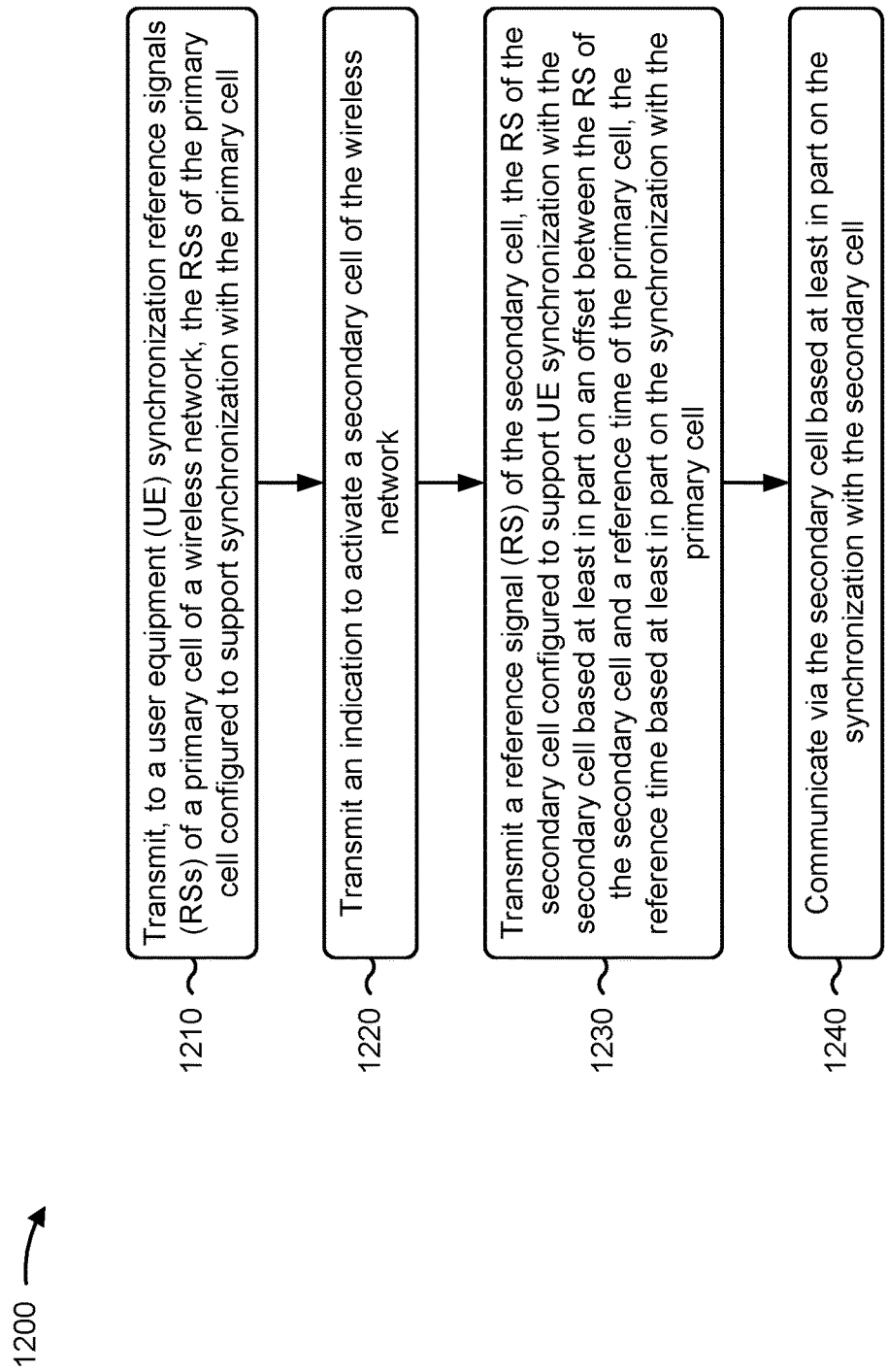
FIG. 12 is a diagram illustrating an example process performed, for example, by a network node, in accordance with the present disclosure.

For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
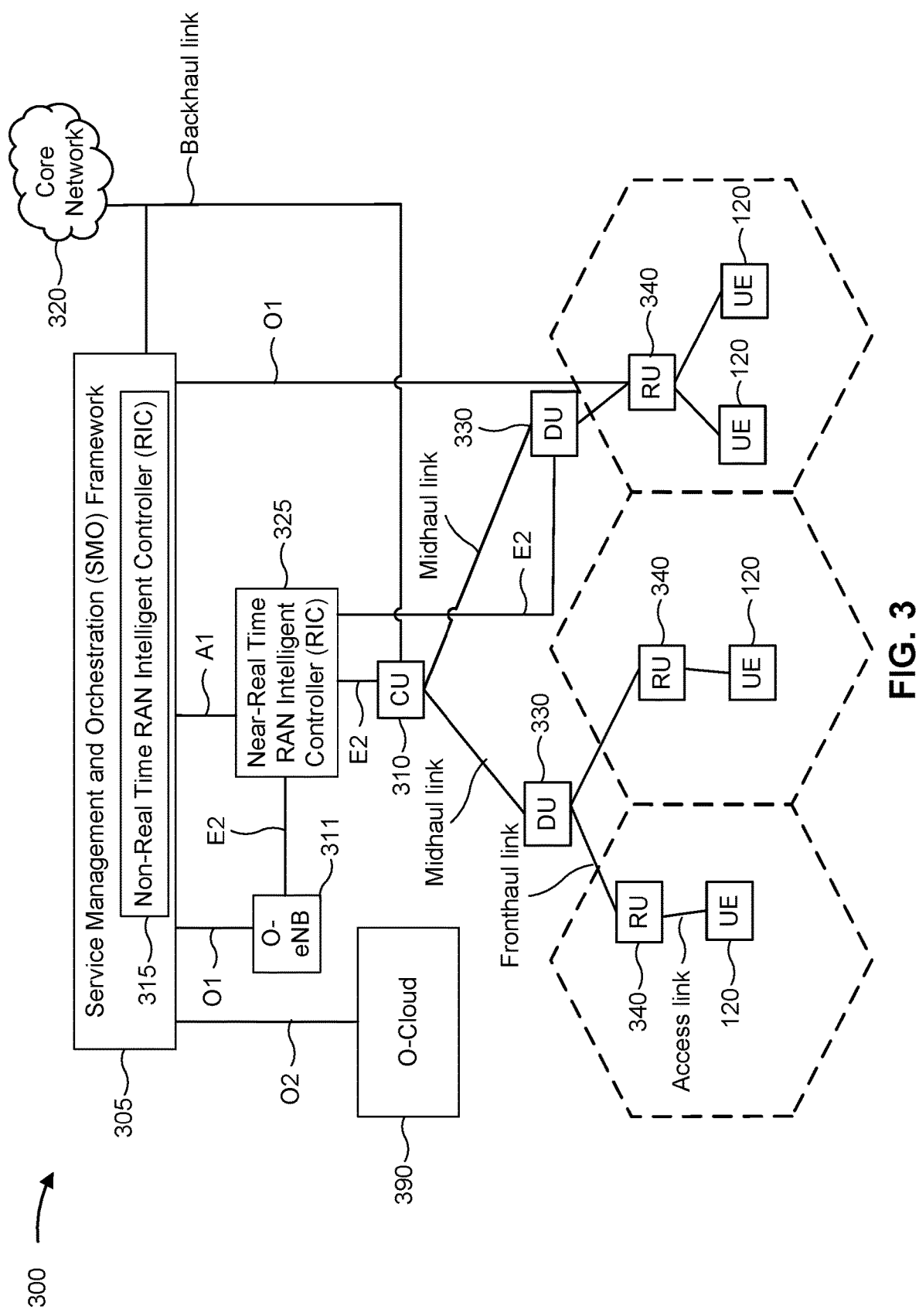
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
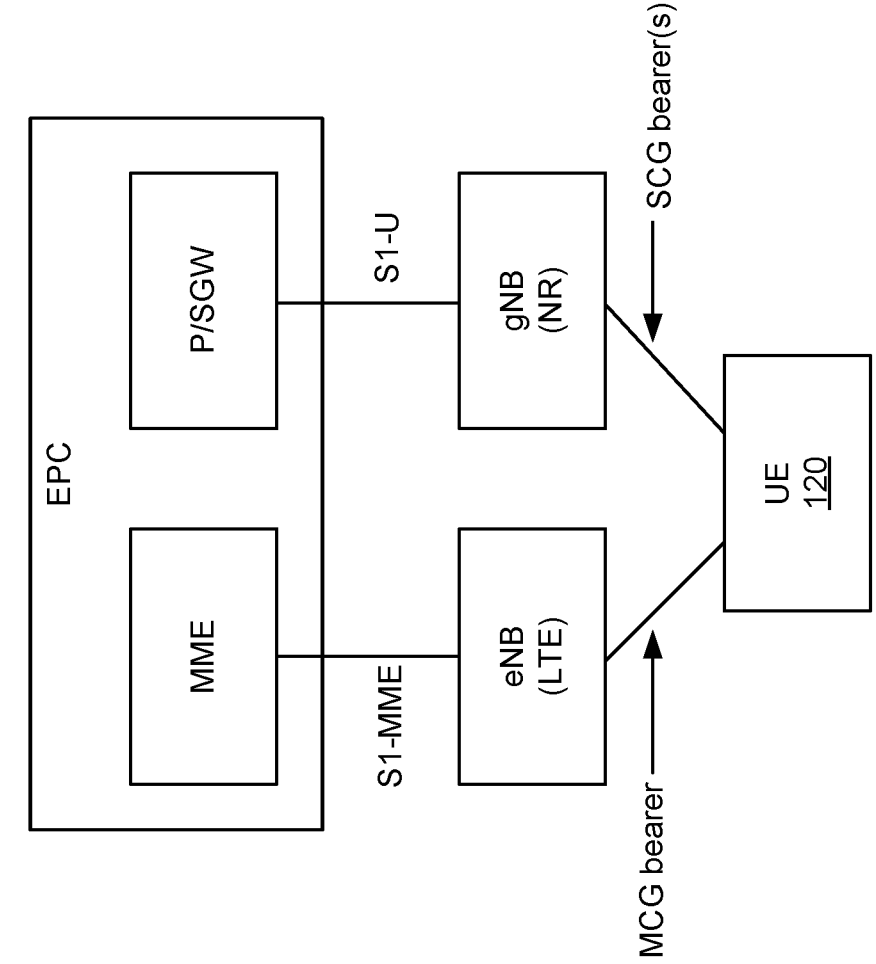
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on an SCell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 4, a UE 120 may communicate with both an eNB (e.g., a 4G network node 110) and a gNB (e.g., a 5G network node 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same network node 110. In some aspects, the eNB and the gNB may be included in different network node 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., RRC information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

In some networks, the MCG and the SCG may be associated with different FRs. For example, the MCG may be associated with FR1 and/or FR2, and the SCG may be associated with FR3, FR4a, FR4, and/or FR5, among other examples. The MCG may be associated with one or more bandwidths on carrier frequencies having relatively high coverage and relatively low propagation loss. The SCG may be associated with one or more bandwidths on carrier frequencies having relatively low coverage and relatively high propagation loss. Additionally, or alternatively, a bandwidth of carriers of the MCG, or a sum of the bandwidths of the MCG, may have a size that is smaller than a bandwidth of carriers of the SCG or a sum of the bandwidths of the SCG. In this way, the SCG may have a higher throughput capacity than the MCG, and the MCG may have a higher reliability than the SCG.

As indicated above, FIG. 4 is provided as an example. Other examples may differ from what is described with respect to FIG. 4.

Figure 5:
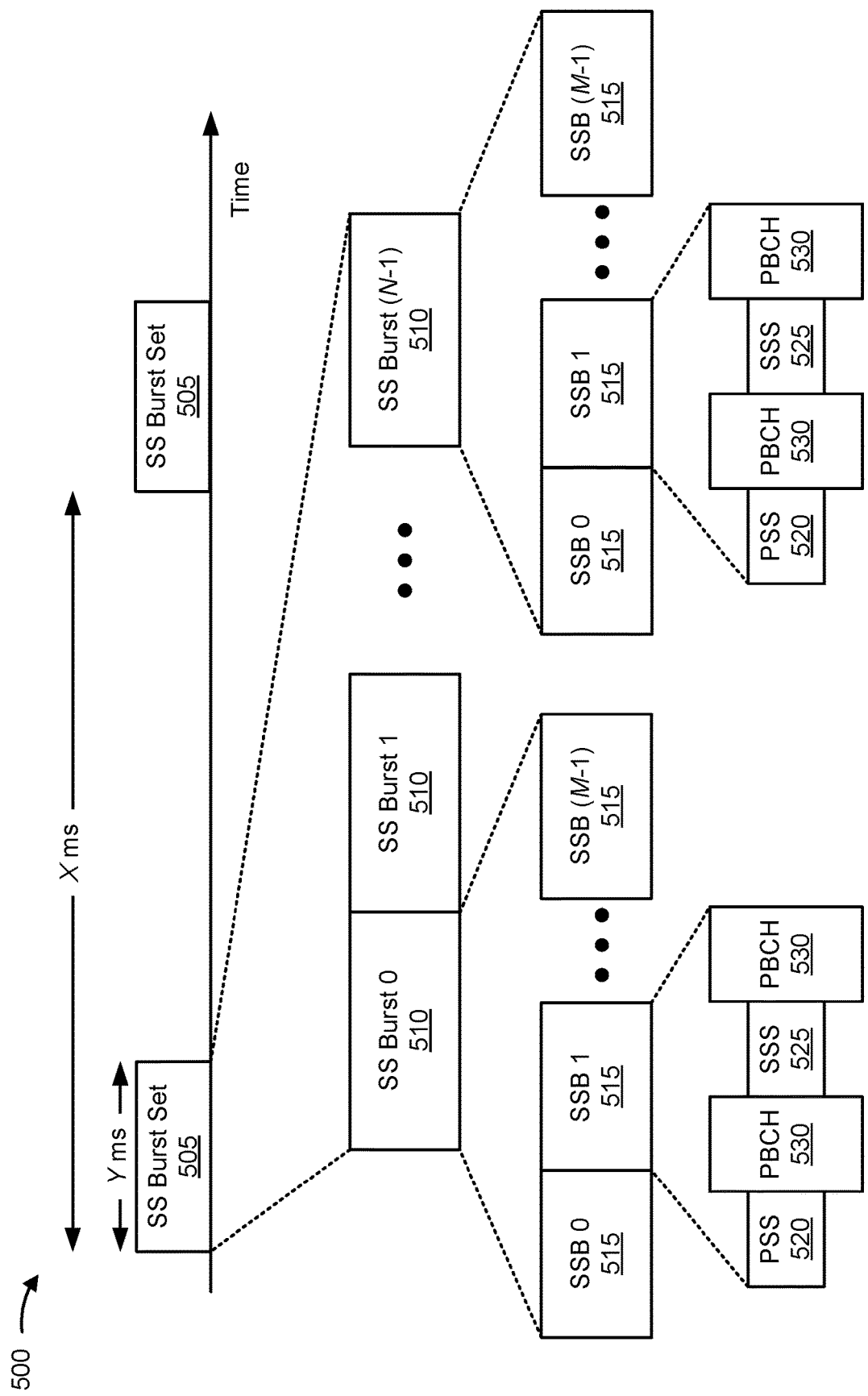
FIG. 5 is a diagram illustrating an example of a synchronization signal (SS) hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by one or more network nodes. As further shown, each SS burst 510 may include one or more SS blocks (SSBs) 515, shown as SSB 0 through SSB M−1, where M is a maximum number of SSBs 515 that can be carried by an SS burst 510. In some aspects, different SSBs 515 may be beamformed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, an SSS 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., a network node 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a network node 110 (e.g., directly or via one or more other network nodes). The network node 110 and the UE 120 may use the one or more indicated SSBs 515 to select one or more beams to be used for communication between the network node 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
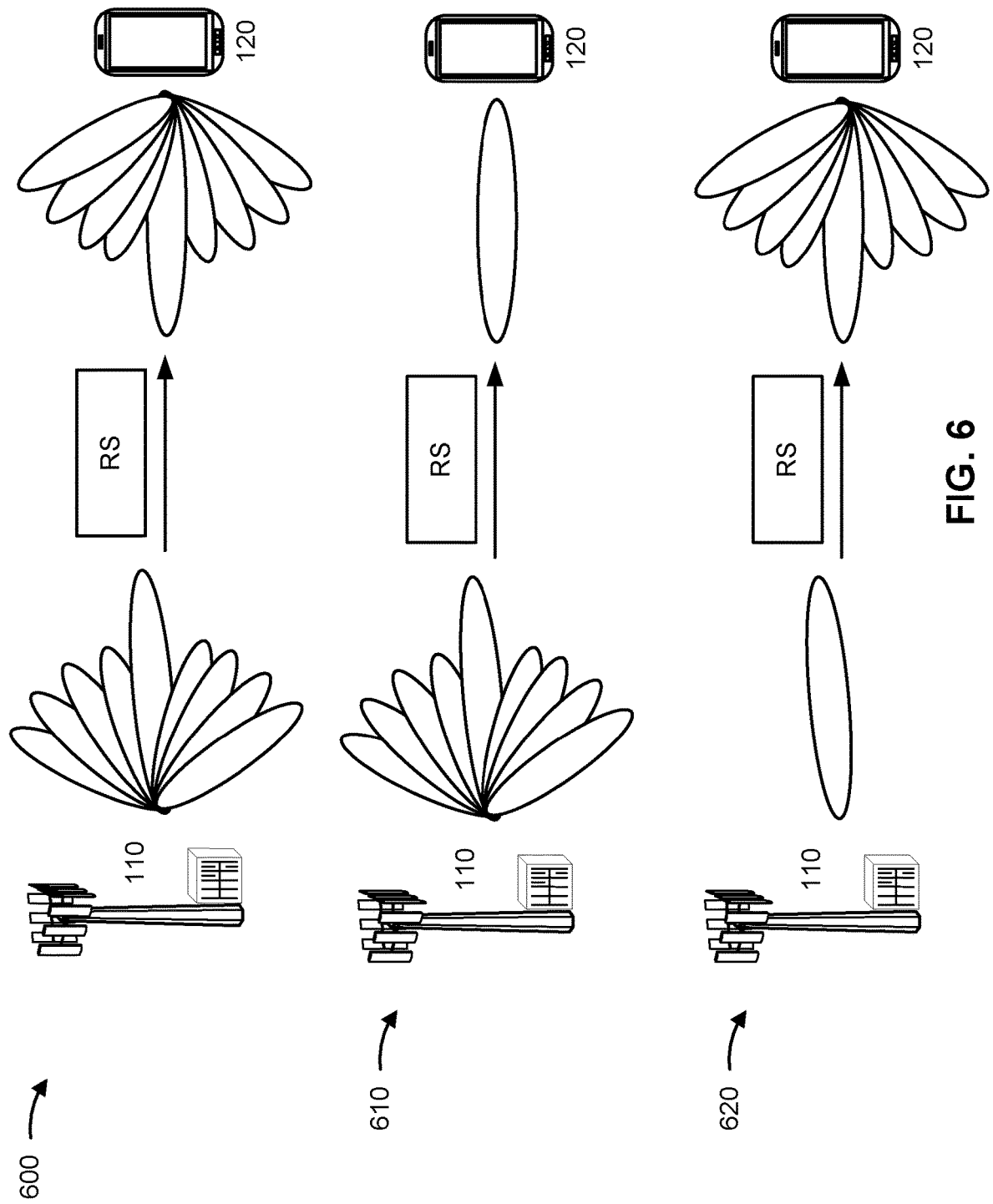
FIG. 6 is a diagram illustrating examples of beam management procedures, in accordance with the present disclosure.

FIG. 6 is a diagram illustrating examples 600, 610, and 620 of beam management procedures, in accordance with the present disclosure. As shown in FIG. 6, examples 600, 610, and 620 include a UE 120 in communication with a network node 110 in a wireless network (e.g., wireless network 100). However, the devices shown in FIG. 6 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 6, example 600 may include a network node 110 (e.g., one or more network node devices such as an RU, a DU, and/or a CU, among other examples) and a UE 120 communicating to perform beam management using RSs (e.g., channel state information reference signals (CSI-RSs) and/or SSBs). Example 600 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 6 and example 600, RSs may be configured to be transmitted from the network node 110 to the UE 120. The RSs may be configured to be periodic (e.g., using RRC signaling), semi-persistent (e.g., using MAC control element (MAC-CE) signaling), and/or aperiodic (e.g., using downlink control information (DCI)).

The first beam management procedure may include the network node 110 performing beam sweeping over multiple transmit (Tx) beams. The network node 110 may transmit an RS using each transmit beam for beam management. To enable the UE 120 to perform Rx beam sweeping, the network node may use a transmit beam to transmit (e.g., with repetitions) each RS at multiple times within the same RS resource set so that the UE 120 can sweep through receive beams in multiple transmission instances. For example, if the network node 110 has a set of N transmit beams and the UE 120 has a set of M receive beams, the RS may be transmitted on each of the N transmit beams M times so that the UE 120 may receive M instances of the RS per transmit beam. In other words, for each transmit beam of the network node 110, the UE 120 may perform beam sweeping through the receive beams of the UE 120. As a result, the first beam management procedure may enable the UE 120 to measure an RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. RSs in example 600 may include CSI-RSs and/or SSBs for beam management in a similar manner as described above.

As shown in FIG. 6, example 610 may include a network node 110 and a UE 120 communicating to perform beam management using RSs. Example 610 depicts a second beam management procedure (e.g., P2 beam management). The second beam management procedure may be referred to as a beam refinement procedure, a network node beam refinement procedure, a TRP beam refinement procedure, and/or a transmit beam refinement procedure. As shown in FIG. 6 and example 610, RSs may be configured to be transmitted from the network node 110 to the UE 120. The RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a RS using each transmit beam of the one or more transmit beams for beam management. The UE 120 may measure each RS using a single (e.g., a same) receive beam (e.g., determined based at least in part on measurements performed in connection with the first beam management procedure). The second beam management procedure may enable the network node 110 to select a best transmit beam based at least in part on measurements of the RSs (e.g., measured by the UE 120 using the single receive beam) reported by the UE 120. RSs in example 610 may include CSI-RSs and/or SSBs for beam management in a similar manner as described above.

As shown in FIG. 6, example 620 depicts a third beam management procedure (e.g., P3 beam management). The third beam management procedure may be referred to as a beam refinement procedure, a UE beam refinement procedure, and/or a receive beam refinement procedure. As shown in FIG. 6 and example 620, one or more RSs may be configured to be transmitted from the network node 110 to the UE 120. The RSs may be configured to be aperiodic (e.g., using DCI). The third beam management process may include the network node 110 transmitting the one or more RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the RS of the transmit beam using the one or more receive beams). RSs in example 620 may include CSI-RSs and/or SSBs for beam management in a similar manner as described above.

In some networks, the beam management procedures may be performed when establishing a connection (or reconnecting) with a network on a cell or cell group. Additionally, the beam management procedures may be performed while already connected with the network on the cell or cell group. An amount of time to perform the beam management procedures when establishing the connection may be longer than an amount of time to perform the beam management procedures while already connected to the network on the cell or cell group. In some networks, the amount of time to perform the beam management procedures when establishing the connection may fail to satisfy a latency requirement of communications intended to be communicated via the cell or cell group. For example, when communicating in a dual connectivity mode, the SCG may be inactive when a throughput of the MCG is sufficient for data communicated via the network. When the throughput of the MCG is insufficient, the network may activate the SCG to increase a combined throughput to satisfy throughput required for the data communicated via the network. However, when activating the SCG, the UE may need to perform the beam management procedures before being scheduled to carry the data. The beam management procedures may require an amount of time that causes the data to fail a latency requirement.

Failure of the latency requirement may cause communication errors, which may consume computing, power, communication, and/or network resources to detect and correct. Additionally, or alternatively, failure of the latency requirement may not be remedied, depending on a data type of the data (e.g., for a data stream where data becomes useless after expiration).

As indicated above, FIG. 6 is provided as an example of beam management procedures. Other examples of beam management procedures may differ from what is described with respect to FIG. 6. For example, the UE 120 and the network node 110 may perform the third beam management procedure before performing the second beam management procedure, and/or the UE 120 and the network node 110 may perform a similar beam management procedure to select a UE transmit beam.

Figure 7:
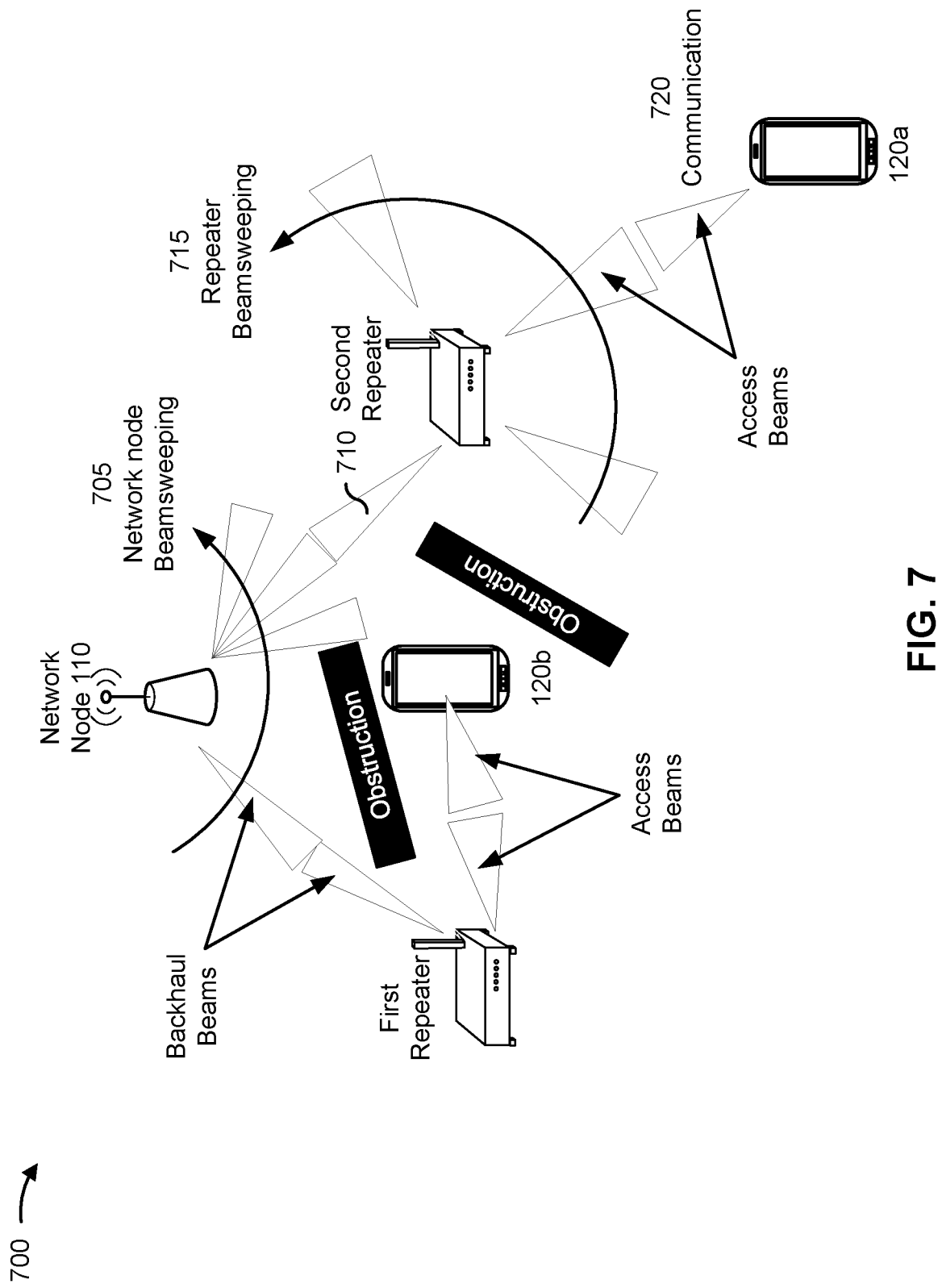
FIG. 7 is a diagram illustrating an example of communicating using a millimeter wave repeater, in accordance with the present disclosure.

FIG. 7 is a diagram illustrating an example 700 of communicating using a millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node 110 that communicates using the sub-6 GHz radio waves. However, a millimeter wave may not be capable of penetrating the same wall (e.g., depending on a thickness of the wall and/or a material from which the wall is constructed). Some techniques and apparatuses described herein use a millimeter wave repeater (which includes, in the example of FIG. 7, a first repeater and a second repeater) to increase the coverage area of a network node 110 and/or to extend coverage to UEs 120 (which include, in the example of FIG. 7, UE 120a and UE 120b) without line of sight to the network node 110 (e.g., due to an obstruction).

For example, as illustrated in the example of FIG. 7, an obstruction between UE 120b and network node 110 blocks or otherwise reduces the quality of a link between the network node 110 and UE 120b. Similarly, an obstruction between UE 120b and first repeater blocks or otherwise reduces the quality of a link between the first repeater and the UE 120b. However, no obstructions or fewer obstructions exist between second repeater and UE 120b, and, as such, it is possible that communications between second repeater and UE 120b will have a higher quality than communications between network node 110 and UE 120b or between first repeater and UE 120b. Furthermore, the millimeter wave repeater described herein may be a layer 1 or an analog millimeter wave repeater, which is associated with a lower cost, less processing, and lower latency than a layer 2 or layer 3 repeater.

A millimeter wave repeater (sometimes referred to herein as a repeater) may perform directional communication by using beamforming to communicate with a network node 110 via a first beam pair (e.g., a backhaul beam pair over a backhaul link with the network node 110) and to communicate with a UE 120 via a second beam pair (e.g., an access beam pair over an access link with the UE 120). For example, in example 700, first repeater can communicate with network node 110 via a first beam pair and can communicate with UE 120a via a second beam pair. Similarly, second repeater can communicate with network node 110 via a first beam pair and can communicate with UE 120a via a second beam pair. A beam pair may refer to a Tx beam used by a first device for transmission and an Rx beam used by a second device for reception of information transmitted by the first device via the Tx beam.

As shown by reference number 705, a network node 110 may use a beamsweeping procedure to transmit communications via multiple beams over time (e.g., using time division multiplexing (TDM)). As shown by reference number 710, the first repeater may receive a communication via an Rx beam of the first repeater. As shown by reference number 715, the first repeater may relay each received communication via multiple Tx beams of the first repeater (e.g., using TDM). As used herein, relaying a communication may refer to transmitting the received communication (e.g., after amplifying the received communication) without decoding the received communication and/or without modifying information carried in the received communication. Alternatively, relaying a received communication may refer to transmitting the received communication after decoding the received communication and/or modifying information carried in the received communication. In some aspects, a received communication may be relayed using a different time resource, a different frequency resource, and/or a different spatial resource (e.g., a different beam) to transmit the communication as compared to a time resource, a frequency resource, and/or a spatial resource in which the communication was received. As shown by reference number 720, a UE 120a may receive a relayed communication. In some aspects, the UE 120a may generate a communication to be transmitted to the network node 110. The UE 120a may then transmit the communication to the first repeater for relaying to the network node 110.

In some aspects, a millimeter wave (mmW) repeater may receive a millimeter wave signal (e.g., an analog millimeter wave signal) from a network node 110, may amplify the millimeter wave signal, and may transmit the amplified millimeter wave signal to one or more UEs 120 (e.g., shown as UE 120f). In some aspects, the mmW repeater may be an analog mmW repeater, sometimes also referred to as a layer 1 mmW repeater. Additionally, or alternatively, the mmW repeater may be a wireless TRP acting as a distributed unit (e.g., of a 5G access node) that communicates wirelessly with a network node 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater may be reduced.

In some networks, multiple repeaters may be used in a communication link that includes two or more hops between the UE and the network node. An amount of latency between the UE and the network node may be based at least in part on a number of repeaters (and/or hops) used in the communication link between the UE and the network node and/or a total path length of the communication link. In some networks, such as in a dual connectivity network, different cells or cell groups may use different paths for communication links between the UE and the network node. In this way, an amount of latency may be different for different cells or cell groups.

As indicated above, FIG. 7 is provided as an example. Other examples may differ from what is described with regard to FIG. 7.

Figure 8:
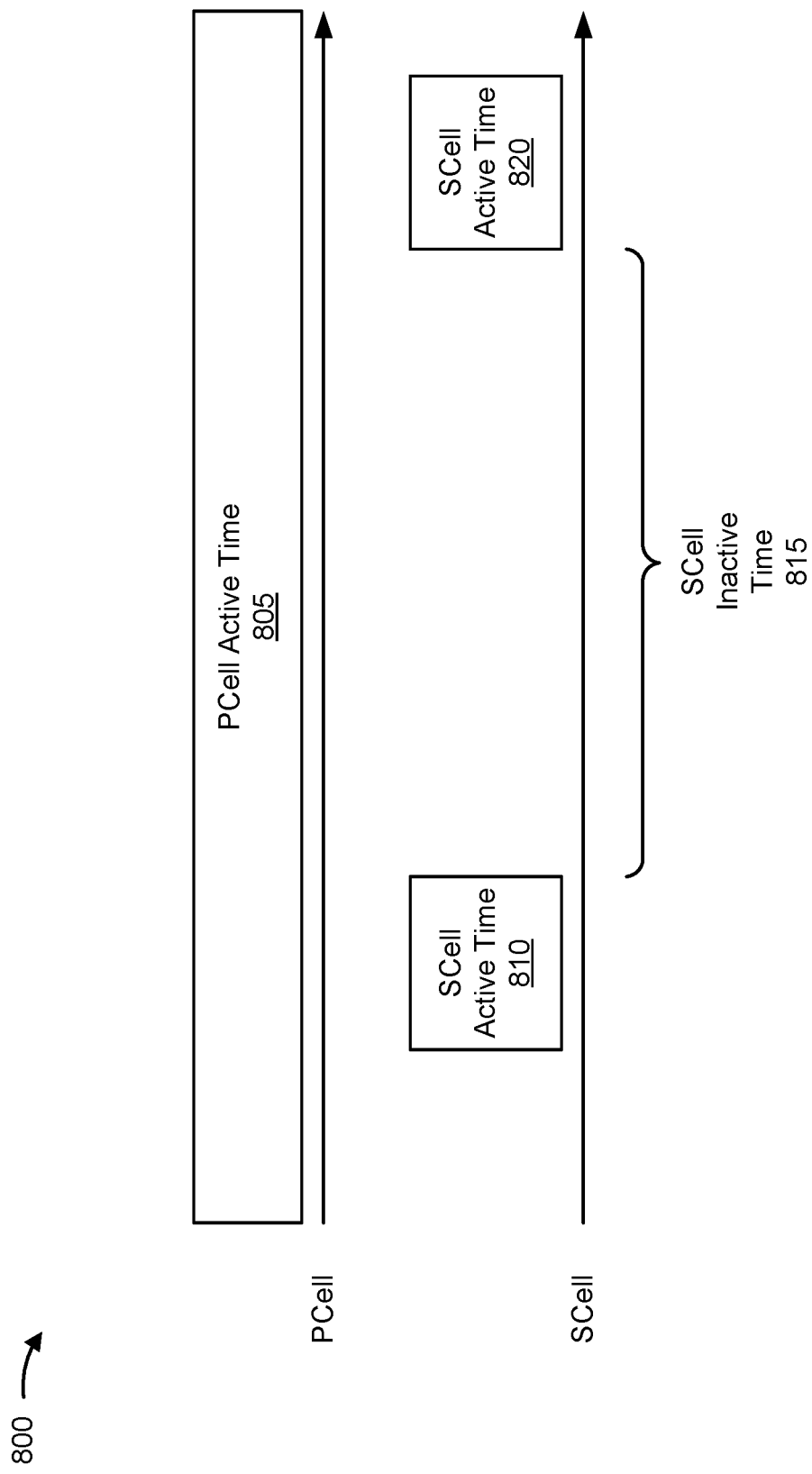
FIG. 8 is a diagram illustrating an example of communicating using a primary cell (PCell) and a secondary cell (SCell), in accordance with the present disclosure.

FIG. 8 is a diagram illustrating an example 800 of communicating using a PCell and an SCell, in accordance with the present disclosure. For example, a UE may communicate with a network node using an NSA connection where the PCell provides an anchor, and the SCell provides increased throughput capacity when needed. The PCell may be part of a PCell group, and/or the second cell may be part of an SCell group. The PCell may be associated with a first FR and/or a first RAT, and the SCell may be associated with a second FR and/or a second RAT (e.g., with the first and second FRs being different and/or the first and second RATs being different).

As shown in FIG. 8, the UE and the network node may communicate during a PCell active time 805. The PCell active time 805 may include a time during which a communication link is established, and the UE and network node are connected.

During the PCell active time 805, the UE and the network node may also communicate via the SCell during an SCell active time 810. The UE and the network node may communicate via the SCell active time 810 based at least in part on an amount of data for communication satisfying a threshold (e.g., exceeding a throughput capacity of the PCell).

The network node may release the SCell for an SCell inactive time 815. The network node may release the SCell to conserve computing, power, communication, and network resources. The network node may again activate the SCell for an SCell active time. For example, the network node may activate the SCell for the SCell active time 820 based at least in part on receiving (e.g., from an application server in communication with the UE) an increased amount of data for the UE, with the increased amount of data satisfying a threshold (e.g., exceeding a throughput capacity of the PCell).

As indicated above, FIG. 8 is provided as an example. Other examples may differ from what is described with regard to FIG. 8.

In some networks, an SCell may have a minimum scope of critical functionality (e.g., relying on a PCell and/or lower frequency band cell for some functionality). For example, a network node may not transmit an "always on" signal, such as an SSB or other RS that a UE can use to synchronize with the network node over the SCell. In some networks, the SCell may be active for sporadic and/or short time sessions with a burst activity pattern, such as that shown in FIG. 8.

In some networks, the SCell (e.g., a subTHz-based SCell) may operate using one or more hops between the UE and the network node. For example, the one or more hops may traverse one or more power-efficient, smart repeaters (repeaters (RPs) and/or access points (APs), among other examples) with out-of-band control using the PCell.

Smart repeaters (e.g., for subTHz) may have functional parts, such as a RedCap UE (RC UE) for PCell connectivity (e.g., to deliver out-of-band control messages, reports, and/or feedbacks, among other examples), wideband analog amplify & forward (AF) functionality for data forwarding, a dedicated narrowband local SSB and/or synchronization RS transmission and/or reception capability over the SCell (e.g., using subTHz carrier frequencies) for complementary time synchronization and beam refinement processing. A communication link between the UE and the network node may have progressive synchronization across hops, hop-specific synchronization, and beam management sessions with customized synchronization RSs and/or SSB mini-burst scheduling.

In some networks, APs and RPs are both smart repeaters. RPs are involved when additional repeaters are required to provide a communication link between an AP and the network node (e.g., base station or RU). APs and RPs may have conceptually a same functionality, with some hardware and capability differences. APs and RPs may be referenced with different names to identify usage. For example, AP may be used to indicate a smart repeater (e.g., a network node and/or wireless communication device) with a direct connection to a UE (e.g., a service link), RP may be used to indicate a smart repeater with an intermediate link or direct link with the network node (e.g., a donor link). As used herein, RP and/or repeater may be used to reference an AP or RP as described herein.

As discussed herein, when an SCell or a PCell operate at different FRs and/or with different RATs, or otherwise operate with different latency between a UE and a network node, synchronization with the PCell may not be sufficient for synchronization with the SCell. Based at least in part on the SCell link not being continuously active with "always on" signals or other synchronization signals when not actively communicating via the SCell, the UE and/or any smart repeaters along the communication link may need to synchronize before beginning communication to avoid communication errors that may have otherwise been caused by timing errors. However, performing a full synchronization procedure and/or a beam management procedure may consume an amount of time that causes data to fail a latency requirement. Additionally, or alternatively, performing a full synchronization procedure may consume power resources unnecessarily. In this way, activating the SCell may provide an increased throughput capacity, but may cause communication errors while the UE synchronizes with the network node via the SCell.

In some aspects described herein, the UE and/or a repeater (e.g., a smart repeater, an AP, and/or an RP, among other examples) may perform synchronization (e.g., time and/or frequency synchronization) with the network node for the SCell, with the synchronization based at least in part on a PCell synchronization.

For example, a wireless communication device (e.g., the UE and/or the repeater) may obtain synchronization with the PCell of a wireless network (e.g., using RSs of the PCell). The wireless communication device may receive an indication to activate an SCell of the wireless network and may receive an RS of the SCell. The wireless communication device may obtain synchronization with the SCell based at least in part on an offset between the RS of the SCell and a reference time of the PCell. The reference time may be based at least in part on the synchronization with the PCell. Once synchronized with the SCell, the wireless communication device may communicate via the SCell. By obtaining synchronization with the SCell based at least in part on an offset between the RS of the SCell and a reference time of the PCell, the network may support acquisition of synchronization over the SCell (e.g., across all hops) in a reduced amount of time as compared to a full synchronization procedure. Additionally, or alternatively, the wireless communication device may conserve power resources that may have otherwise been consumed by performing a full synchronization procedure over the SCell.

The synchronization with the SCell may be based at least in part on using a single hop (e.g., direct) or multi-hop communication link between the UE and the network node. In some aspects, a multi-hop synchronization procedure can be established using a progressive synchronization approach where a first RP is synchronized (e.g., using a synchronization RS transmitted by the network node to the first RP or transmitted by the network node using a beam that is nearest to the RP), a second RP is synchronized (e.g., the first RP transmits a synchronization RS to the second RP based at least in part on a downlink synchronization of the first RP), and so on until the UE is reached and synchronized (e.g., an AP with a direct link with the UE transmits a synchronization RS based at least in part on a downlink synchronization of the AP).

In some aspects, a local frequency tracking loop (FTL) or frequency synchronization may not be required for the SCell (e.g., a subTHz SCell). Frequency tracking and/or a corresponding parts per million (ppm) error (ppm err) that is based at least in part on the PCell (e.g., a PCell connectivity) may be reused and/or projected onto the SCell (e.g., a frequency band of the SCell). In some aspects, the frequency tracking and/or ppm error may be modified and/or offset for application to the SCell.

In some aspects, a PCell time tracking loop (TTL) and PCell timing may be used as a coarse timing reference for the SCell. In some aspects, no independent TTL is used on the SCell and only a complementary fine-timing estimation (delta timing offset (TO)) with respect to PCell timing is required for SCell time synchronization. The time synchronization for the DCI may be performed based at least in part on dedicated synchronization RS (e.g., SSB or other RS) mini bursts transmitted during SCell hop-specific synchronization and/or beam management sessions.

The SCell time synchronization session (which may include also a beam management synchronization) may be scheduled and/or performed by the network node via the PCell. For example, SCell time synchronization session may be scheduled and/or performed by the network node per link activation (e.g., an indication to activate the SCell), per pre-defined time period and/or periodicity along a long-lasting active SCell-based data offloading session, and/or as an event driven synchronization session scheduled during an active data offloading session responsive to one or more events, among other examples.

In some aspects, a time synchronization session may be based at least in part on a synchronization session configuration for a reception side (and transmission side of intermediate hops) that is indicated and/or performed over a PCell link and with reference to PCell timing. In some aspects, the time synchronization session may use PCell timing information for coarse time synchronization and/or referencing to define time search boundaries and/or a time uncertainty for an SCell local synchronization session per SCell link activation. A wireless communication device (e.g., a downstream wireless communication device) may estimate fine timing (e.g., a delta timing offset) for the SCell with respect to a configured reception time for the SCell synchronization session based at least in part on a PCell timing, slot, and/or control signaling slot. In this way the wireless communication device may have no independent TTL on the SCell, and the SCell time synchronization is obtained based at least in part on the PCell coarse time and a locally estimated relative timing offset. In some aspects, an overall time synchronization per multi-hop link may be established using a progressive synchronization approach.

In some aspects, an SCell control message may be signaled over the PCell with reference to (e.g., as a timing reference for determining and/or application of the timing offset) a PCell downlink slot index, a PCell symbol within a downlink slot, a PCell downlink slot carrying the control message (e.g., physical downlink control channel (PDCCH)), a scheduling event on the PCell for either the PCell or the SCell (e.g., indicated relative to this scheduling and based on PCell timing), and/or an additional time offset relative to any of the previous references. In some aspects, the additional time offset may be indicated and/or configured for synchronization with the SCell.

In some aspects, a relative offset in SCell time units (e.g., symbols and/or slots) may be provided for an SCell control application for communications assumed to be scheduled via the SCell. For example, every PCell slot and/or symbol may include multiple SCell slots/symbols, so the SCell control information (e.g., scheduling DCI) may indicate a timing of subsequent SCell time units with reference to a PCell time unit. SCell control information may indicate scheduling of synchronization RS s and/or associated reception and/or transmission time, scheduling of SCell data and/or a forwarding operation, and/or scheduling of SCell link adaptation (LA) RS, among other examples.

To indicate the SCell control information with reference to PCell timing may be used based at least in part on the wireless communication device transmitting an indication of synchronization (e.g., an "in sync" status bit to be indicated by the SCell to the PCell in uplink control information (UCI) as a response to the synchronization session to indicate that the synchronization procedures were successful (e.g., by measuring if channel RSSI is large from some pre-defined threshold)). In some aspects, once the indication of synchronization is transmitted (e.g., the "in sync" status bit is turned on), the network node may schedule data periodically and/or based at least in part on an event. In some aspects, the synchronization status may be valid until changes in PCell and SCell relative channel delay and/or a dominant line-of-sight (LOS) channel path, TTL movement and/or drift for the PCell satisfy a threshold (e.g., this may be related to some abnormal dynamics related to the PCell channel and/or communication link), or a beam switch of the PCell.

In some aspects, for long-lasting SCell data offloading sessions and/or SCell link activation or duration scenarios, the synchronization sessions for the SCell may be repeated periodically or semi-periodically once per some time threshold duration to update a relative time offset estimation to maintain a negligible time mismatch between the SCell and PCell timing, may be a-periodically scheduled once per threshold time duration, or may be event-driven, among other examples.

Based at least in part on using the PCell synchronization for SCell synchronization, the network may support acquisition of synchronization over the SCell (e.g., across all hops) in a reduced amount of time and/or may conserve power resources that may have otherwise been used to perform full synchronization using only SCell signals.

Additionally, or alternatively, a progressive synchronization approach supports low latency and low power multi-hop link synchronization with smart repeaters having a PCell-based out-of-band control. For example, in a network with one or more repeaters between a UE and a network node, using the PCell-based (e.g., out-of-band for the SCell) timing to assist in synchronization of the SCell, each of the one or more repeaters may conserve power resources that may have otherwise been consumed by funny synchronizing using only SCell signaling.

Further, using the PCell synchronization for SCell synchronization may support faster SCell link activation and deactivation for eligible UEs with low complexity, low power, and low latency penalties to support a burst activity pattern for improved power efficiency. For example, the wireless communication device may obtain synchronization of the SCell more quickly than if using only SCell signaling. In this way, use of the SCell for intermittent, burst, and/or high throughput communications when needed to temporarily supplement the PCell may be optimized for efficiency in consumption of power resources.

In some aspects, using the PCell synchronization for SCell synchronization may extend a range of use cases and scenarios where SCells having relatively high FRs may be used with reasonable implementation and deployment implications (e.g., with relatively fast SCell link activation and reduced power consumption). Further, using the PCell synchronization for SCell synchronization may speed up initial high-FR (e.g., subTHz) deployments (e.g., with a strong reliance on lower frequency bands).

Figure 9:
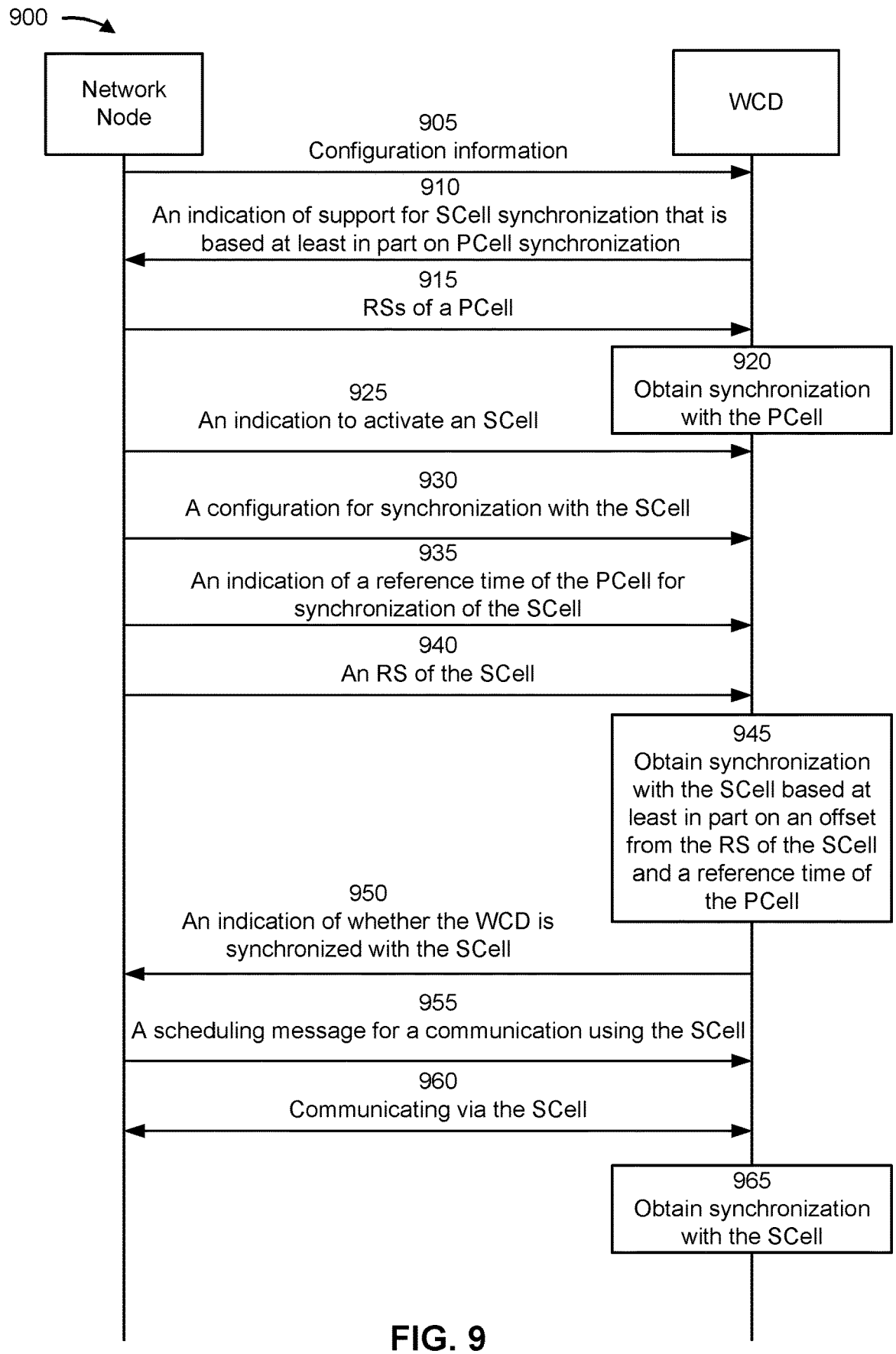
FIG. 9 is a diagram of an example associated with SCell synchronization, in accordance with the present disclosure.

FIG. 9 is a diagram of an example 900 associated with SCell synchronization, in accordance with the present disclosure. As shown in FIG. 9, a network node (e.g., network node 110, a CU, a DU, and/or an RU) may communicate with a wireless communication device (WCD) (e.g., UE 120, a network node 110 such as a RP, an AP, and/or a forwarding node). In some aspects, the network node and the wireless communication device may be part of a wireless network (e.g., wireless network 100). The wireless communication device and the network node may have established a wireless connection prior to operations shown in FIG. 9.

As shown by reference number 905, the network node may transmit, and the wireless communication device may receive, configuration information. In some aspects, the wireless communication device may receive the configuration information via one or more of RRC signaling, one or more MAC-CEs, and/or DCI, among other examples. In some aspects, the configuration information may include an indication of one or more configuration parameters (e.g., already known to the wireless communication device and/or previously indicated by the network node or other network device) for selection by the wireless communication device, and/or explicit configuration information for the wireless communication device to use to configure the wireless communication device, among other examples.

In some aspects, the configuration information may indicate that the wireless communication device is to transmit an indication of support for SCell synchronization that is based at least in part on PCell synchronization.

In some aspects, the network node may transmit the configuration information via a PCell of a connection with the wireless communication device. In some aspects, the PCell may operate using an FR that is relatively low in comparison with an SCell. The PCell may be part of an MCG The UE may configure itself based at least in part on the configuration information. In some aspects, the UE may be configured to perform one or more operations described herein based at least in part on the configuration information.

As shown by reference number 910, the wireless communication device may transmit, and the network node may receive, an indication of support for SCell synchronization that is based at least in part on PCell synchronization. In some aspects, a capabilities report may indicate UE support for SCell synchronization that is based at least in part on PCell synchronization.

As shown by reference number 915, the wireless communication device may receive, and the network node may transmit, RSs of a PCell. In some aspects, the RSs of the PCell may include SSBs and/or CSI-RSs. In some aspects, the RSs may include other types of RSs, such as DMRSs within a data communication and/or a tracking reference signal (TRS).

As shown by reference number 920, the wireless communication device may obtain synchronization with the PCell. For example, the wireless communication device may use the RSs of the PCell to synchronize the wireless communication device in a time domain and/or in a frequency domain.

As shown by reference number 925, the wireless communication device may receive, and the network node may transmit, an indication to activate an SCell. The SCell may be a part of the wireless network that is associated with the PCell. In some aspects, the SCell may be part of an SCG. In some aspects, the SCell may be associated with a frequency bandwidth that is higher than a frequency bandwidth of the PCell. This may cause the PCell to have higher reliability than the SCell.

In some aspects, the indication to activate the SCell may include a MAC-CE configured to activate the SCell. The wireless communication device may receive the indication to activate the SCell via a communication using the PCell.

As shown by reference number 930, the wireless communication device may receive, and the network node may transmit, a configuration for synchronization with the SCell. For example, the configuration for synchronization with the SCell may indicate one or more parameters for using a reference time of the PCell to synchronization with the SCell. For example, the one or more parameters may indicate whether the SCell will have a time tracking loop (e.g., independent from the PCell) and/or times during which the SCell will have a time tracking loop. In some aspects, the one or more parameters indicate resources of an RS of the SCell to use for fine timing estimation as a complement to a coarse timing estimation using the PCell. In some aspects, the one or more parameters may indicate a schedule for a synchronization session associated with the SCell and/or the PCell. In some aspects, the configuration includes the indication to activate the SCell.

As shown by reference number 935, the wireless communication device may receive, and the network node may transmit, an indication of a reference time of the PCell for synchronization of the SCell. In some aspects, the reference time of the PCell may be based at least in part on a downlink slot index of the PCell, a symbol within a downlink slot of the PCell, a downlink slot index that carries control information associated with the SCell, a scheduling event on the PCell, and/or a time unit that is offset, by an indicated amount, from any of these, among other examples.

In some aspects, the indication described in connection with reference number 925, the configuration described in connection with reference number 930 and/or the indication described in connection with reference number 935 may be combined into one or two messages.

As shown by reference number 940, the wireless communication device may receive, and the network node may transmit, an RS of the SCell. In some aspects, the RS of the SCell may be used to support a determination of a time offset of a hop of the communication link between the wireless communication device and the network node. In some aspects, the RS of the SCell may include an SSB or another RS type. In some aspects, the wireless communication device may receive the RS of the SCell within a time window that is based at least in part on an offset and/or the configuration with the SCell.

In some aspects, the wireless communication device may receive the RS of the SCell via an over-the-air path that includes multiple hops. For example, the RS of the SCell may be forwarded by an RP and/or an AP between the network node and the wireless communication device. In some aspects, the RP and/or the AP may modify and/or re-transmit the RS of the SCell as part of forwarding. In some aspects, the RP and/or the AP may apply a timing offset associated with the RP and/or the AP before forwarding the RS of the SCell.

In some aspects, receiving the RS of the SCell includes receiving an RS burst (e.g., a transmission that occupies fewer than all time resources of a slot or subframe) received during a synchronization session or received during a beam management session. In some aspects, the synchronization session or the beam management session is associated with a frequency-range-specific synchronization session or beam management session, a secondary-cell-specific specific synchronization session or beam management session, and/or a hop-specific specific synchronization session or beam management session, among other examples.

As shown by reference number 945, the wireless communication device may obtain synchronization with the SCell based at least in part on an offset from the RS of the SCell and a reference time of the PCell. For example, the wireless communication device may use the reference time of the PCell as a coarse timing and may refine timing based at least in part on refining the coarse timing using an offset determined from the RS of the SCell. The reference time may be based at least in part on the synchronization with the PCell. For example, the reference time may rely on the synchronization with the PCell to use a time unit (e.g., a slot or symbol) of the PCell as the reference time.

In some aspects, the wireless communication device may obtain the reference time of the PCell via the indication of the reference time as described in connection with reference number 935. In some aspects, the wireless communication device may obtain the reference time via observation at the wireless communication device (e.g., measuring signals) and/or via an out-of-band communication. In some aspects, the reference time of the PCell is based at least in part on an FTL of the PCell and/or a RAN time unit of the PCell.

In some aspects, obtaining the synchronization with the SCell may be based at least in part on a configured periodicity of synchronizing the SCell and/or a trigger event during ongoing communications via the SCell. For example, the wireless communication device may be configured with a periodicity or a set of one or more events that may trigger synchronizing the SCell.

In some aspects, the network node may obtain synchronization with the wireless communication device based at least in part on the wireless communication device obtaining synchronization with the network node. In some aspects, the wireless communication device may indicate that the wireless communication device has obtained synchronization with the network node and that may be part of the network node obtaining synchronization with the wireless communication device.

As shown by reference number 950, the wireless communication device may transmit, and the network node may receive, an indication of whether the wireless communication device is synchronized with the SCell. For example, the wireless communication device may transmit the indication that the wireless communication device is synchronized with the SCell via UCI. In some aspects, the indication may be a single bit indication. In some aspects, the network node may schedule communications via the SCell only if the wireless communication device indicates synchronization with the SCell. Alternatively, the network node may schedule communications via the SCell only if the wireless communication device has not indicated a failure of synchronization with the SCell.

In some aspects, the indication of whether the wireless communication device is synchronized with the SCell applies for a duration of time that expires based at least in part on a change in a relative channel delay between the PCell and the SCell, a change in a dominant line-of-site path for the SCell or the PCell, a beam switch for the PCell, a change in a TTL that satisfies a threshold, and/or after a configured amount of time, among other examples.

As shown by reference number 955, the wireless communication device may receive, and the network node may transmit, a scheduling message for a communication using the SCell. In some aspects, the scheduling message may reference timing in the PCell. In some aspects, receiving the scheduling message may include receiving an indication of a first time unit of the PCell and receiving an indication of a second time unit of the SCell within the first time unit. For example, the scheduling message may indicate a slot of the PCell. However, the slot of the PCell may include multiple slots of the SCell (e.g., based at least in part on different subcarrier spacing and symbol length). In this case, the scheduling message may indicate the second time unit of the SCell to indicate which of the multiple slots of the SCell included in the slot of the PCell that is scheduled for communication via the SCell.

As shown by reference number 960, the wireless communication device and the network node may communicate via the second cell. For example, the network node may transmit, and the wireless communication device may receive, data that does not fit within a throughput of the PCell.

As shown by reference number 965, the wireless communication device may obtain synchronization with the SCell. For example, the wireless communication device may re-synchronize with the SCell after communicating via the SCell for an amount of time that satisfies a threshold.

In some aspects, re-synchronization with the SCell may be based at least in part on a configured periodicity of synchronizing the SCell and/or a trigger event during ongoing communications via the SCell. For example, the wireless communication device may be configured with a periodicity or a set of one or more events that may trigger re-synchronizing the SCell.

Based at least in part on using the PCell synchronization for SCell synchronization, the network may support acquisition of synchronization over the SCell (e.g., across all hops) in a reduced amount of time. Additionally, or alternatively, a progressive synchronization approach supports low latency and low power multi-hop link synchronization with smart repeaters having a PCell based out-of-band control. Further, using the PCell synchronization for SCell synchronization may support faster SCell link activation and deactivation for eligible wireless communication devices with low complexity, low power, and low latency penalties to support a burst activity pattern for improved power efficiency. In some aspects, using the PCell synchronization for SCell synchronization may extend a range of use cases and scenarios where SCells having relatively high FRs may be used with reasonable implementation and deployment implications. Further, using the PCell synchronization for SCell synchronization may speed up initial high-FR (e.g., subTHz) deployments (e.g., with a strong reliance on lower frequency bands).

As indicated above, FIG. 9 is provided as an example. Other examples may differ from what is described with respect to FIG. 9.

Figure 10:
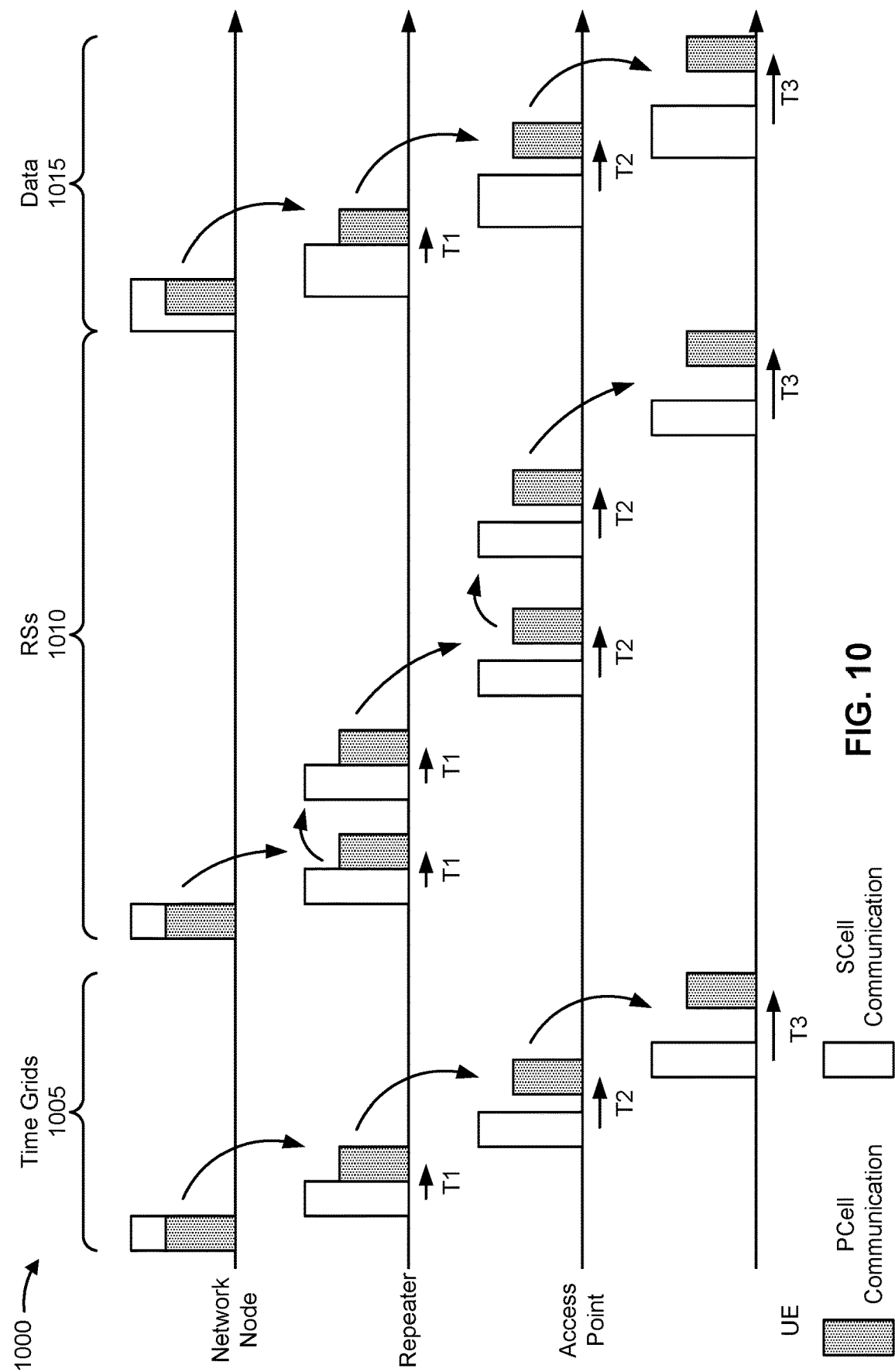
FIG. 10 is a diagram of an example associated with SCell synchronization, in accordance with the present disclosure.

FIG. 10 is a diagram of an example 1000 associated with SCell synchronization, in accordance with the present disclosure. As shown in FIG. 10, a network node (e.g., network node 110, a CU, a DU, and/or an RU) may communicate with one or more wireless communication devices (e.g., UE 120, an RP, an AP, and/or a forwarding node). In some aspects, the network node and the one or more wireless communication devices may be part of a wireless network (e.g., wireless network 100). The one or more wireless communication devices and the network node may have established a wireless connection prior to operations shown in FIG. 10. In some aspects, the one or more wireless communication devices and the network node may have established synchronization with a PCell used for communication.

As shown in FIG. 10, the network node, an RP, an AP, and a UE may have time grids 1005. As shown in the time grids 1005, the network node may originate both PCell communications and SCell communications with substantial synchronization. However, PCell communications and SCell communications may arrive at different times (e.g., without synchronization) at the one or more wireless communication devices. For example, at the RP, a time offset of T1 separates reception of PCell and SCell communications. Similarly, a time offset of T2 separates reception of PCell and SCell communications at the AP, and a time offset of T2 separates reception of PCell and SCell communications at the UE.

In some aspects, the network node and the one or more wireless communication devices may be synchronized on PCell downlink timing (tracked with local PCell reception downlink timing, which can be used as a coarse or initial timing reference for the SCell). In some aspects, a ppm offset may be tracked. For example, SCell frequency Offsets may be corrected and/or known, and a sampling rate may be adjusted to avoid cumulative time drifts (e.g., assuming a same phased locked loop (PLL) where the PCell and the SCell use a same clock, reference is used for the PCell and the SCell and quasi-static channels for the PCell and SCell where UE mobility satisfies a threshold).

In some aspects, PCell and SCell (e.g., subTHz) propagation may travel via different channels (e.g., for the AP and the UE) and may have a relative time offset. For example, the PCell downlink local reception timing may be shifted relative to the PCell local reception timing grid. This relative time offset may be estimated and/or tracked by an SCell downlink synchronization procedure during an active traffic offloading session.

As shown by FIG. 10, the network node, the RP, the AP, and the UE may communicate RSs 1010 to obtain synchronization. For example, the network node may transmit RSs to the RP for the RP to estimate a time offset T1 between the PCell and the SCell. The RP may transmit RSs to the AP with the offset T1 between RSs of the PCell and RSs of the SCell. The AP may determine an offset T2 between the PCell and the SCell. The AP may transmit RSs to the UE with the offset T2 between the PCell and the SCell. The UE may determine an offset T3 between the PCell and the SCell based at least in part on the RSs from the AP.

In some aspects, T1 may be estimated based at least in part on selected network node SSBs. An SCell time grid may be synchronized on the RP side with the time of the SCell reception (downlink) being at a time of the PCell reception plus or minus T1.

In some aspects, T2 may be estimated based at least in part on selected RP SSBs. An SCell time grid may be synchronized on the AP side with the time of the SCell reception (downlink) being at a time of the AP reception of the PCell plus or minus T2.

In some aspects, T3 may be estimated based at least in part on selected AP SSBs. An SCell time grid may be synchronized on the UE side with the time of the SCell reception (downlink) being at a time of the UE reception of the PCell plus or minus T3.

As shown in FIG. 10, the network node, the RP, the AP, and the UE may communicate data 1015 via the PCell and the SCell. In some aspects, each of the RP, the AP, and the UE may apply T1, T2, or T3, respectively, as timing offsets, relative to the PCell, for receiving data via the SCell.

As indicated above, FIG. 10 is provided as an example. Other examples may differ from what is described with respect to FIG. 10.

FIG. 11 is a diagram illustrating an example process 1100 performed, for example, by a wireless communication device, in accordance with the present disclosure. Example process 1100 is an example where the wireless communication device (e.g., UE 120 or a network node 110) performs operations associated with SCell synchronization.

As shown in FIG. 11, in some aspects, process 1100 may include obtaining synchronization with a PCell of a wireless network (block 1110). For example, the wireless communication device (e.g., using communication manager 140 or 150 and/or communication manager 1308, depicted in FIG. 13) may obtain synchronization with a PCell of a wireless network, as described above.

As further shown in FIG. 11, in some aspects, process 1100 may include receiving an indication to activate an SCell of the wireless network (block 1120). For example, the wireless communication device (e.g., using communication manager 140 or 150 and/or reception component 1302, depicted in FIG. 13) may receive an indication to activate an SCell of the wireless network, as described above.

As further shown in FIG. 11, in some aspects, process 1100 may include receiving RS of the SCell (block 1130). For example, the wireless communication device (e.g., using communication manager 140 or 150 and/or reception component 1302, depicted in FIG. 13) may receive RS of the SCell, as described above.

As further shown in FIG. 11, in some aspects, process 1100 may include obtaining synchronization with the SCell based at least in part on an offset between the RS of the SCell and a reference time of the PCell, the reference time based at least in part on the synchronization with the PCell (block 1140). For example, the wireless communication device (e.g., using communication manager 140 or 150 and/or communication manager 1308, depicted in FIG. 13) may obtain synchronization with the SCell based at least in part on an offset between the RS of the SCell and a reference time of the PCell, the reference time based at least in part on the synchronization with the PCell, as described above.

As further shown in FIG. 11, in some aspects, process 1100 may include communicating via the SCell based at least in part on the synchronization with the SCell (block 1150). For example, the wireless communication device (e.g., using communication manager 140 or 150 and/or reception component 1302 transmission component 1304, and/or communication manager 1308, depicted in FIG. 13) may communicate via the SCell based at least in part on the synchronization with the SCell, as described above.

Process 1100 may include additional aspects, such as any single aspect or any combination of aspects described below and/or in connection with one or more other processes described elsewhere herein.

In a first aspect, the PCell is associated with a first frequency bandwidth that is lower than a frequency bandwidth of the SCell.

In a second aspect, alone or in combination with the first aspect, receiving the RS of the SCell comprises receiving the RS of the SCell via an over-the-air path that includes multiple hops.

In a third aspect, alone or in combination with one or more of the first and second aspects, the reference time of the PCell is based at least in part on a frequency tracking loop of the PCell, or a radio access network time unit of the PCell.

In a fourth aspect, alone or in combination with one or more of the first through third aspects, receiving the RS of the SCell comprises one or more of receiving an RS burst received during a synchronization session, or receiving an RS burst received during a beam management session.

In a fifth aspect, alone or in combination with one or more of the first through fourth aspects, the synchronization session or the beam management session is associated with a frequency-range-specific synchronization session or beam management session, a secondary-cell-specific specific synchronization session or beam management session, or a hop-specific specific synchronization session or beam management session.

In a sixth aspect, alone or in combination with one or more of the first through fifth aspects, process 1100 includes receiving, via the PCell, a configuration for the synchronization with the SCell.

In a seventh aspect, alone or in combination with one or more of the first through sixth aspects, the configuration schedules the RS of the SCell, or wherein the configuration includes the indication to activate the SCell.

In an eighth aspect, alone or in combination with one or more of the first through seventh aspects, obtaining the synchronization with the SCell is based at least in part on a configured periodicity of synchronizing the SCell, or a trigger event during ongoing communications via the SCell.

In a ninth aspect, alone or in combination with one or more of the first through eighth aspects, process 1100 includes receiving an indication of the reference time of the PCell.

In a tenth aspect, alone or in combination with one or more of the first through ninth aspects, the reference time of the PCell is based at least in part on one or more of a downlink slot index of the PCell, a symbol within a downlink slot of the PCell, a downlink slot index that carries control information associated with the SCell, a scheduling event on the PCell, or a time unit that is offset, by an indicated amount, from any of the above.

In an eleventh aspect, alone or in combination with one or more of the first through tenth aspects, communicating via the SCell comprises receiving a scheduling message for a communication using the SCell, that references timing in the PCell, and wherein receiving the scheduling message comprises receiving an indication of a first time unit of the PCell, and receiving an indication of a second time unit of the SCell within the first time unit.

In a twelfth aspect, alone or in combination with one or more of the first through eleventh aspects, process 1100 includes transmitting an indication of whether the wireless communication device is synchronized with the SCell.

In a thirteenth aspect, alone or in combination with one or more of the first through twelfth aspects, the indication indicates that the wireless communication device is synchronized with the SCell, and wherein communicating via the SCell is based at least in part on transmitting the indication that the wireless communication device is synchronized with the SCell.

In a fourteenth aspect, alone or in combination with one or more of the first through thirteenth aspects, the indication of whether the wireless communication device is synchronized with the SCell applies for a duration of time that expires based at least in part on one or more of a change in a relative channel delay between the PCell and the SCell, a change in a dominant line-of-site path for the SCell or the PCell, a beam switch for the PCell, or a change in a timing tracking loop that satisfies a threshold.

In a fifteenth aspect, alone or in combination with one or more of the first through fourteenth aspects, the wireless communication device comprises a UE, or a forwarding node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a network node, in accordance with the present disclosure. Example process 1200 is an example where the network node (e.g., network node 110) performs operations associated with SCell synchronization.

As shown in FIG. 12, in some aspects, process 1200 may include transmitting, to a UE synchronization RSs of a PCell of a wireless network, the RSs of the PCell configured to support synchronization with the PCell (block 1210). For example, the network node (e.g., using communication manager 150 and/or transmission component 1404, depicted in FIG. 14) may transmit, to a UE synchronization RSs of a PCell of a wireless network, the RSs of the PCell configured to support synchronization with the PCell, as described above.

As further shown in FIG. 12, in some aspects, process 1200 may include transmitting an indication to activate an SCell of the wireless network (block 1220). For example, the network node (e.g., using communication manager 150 and/or transmission component 1404, depicted in FIG. 14) may transmit an indication to activate an SCell of the wireless network, as described above.

As further shown in FIG. 12, in some aspects, process 1200 may include transmitting RS of the SCell, the RS of the SCell configured to support UE synchronization with the SCell based at least in part on an offset between the RS of the SCell and a reference time of the PCell, the reference time based at least in part on the synchronization with the PCell (block 1230). For example, the network node (e.g., using communication manager 150 and/or transmission component 1404, depicted in FIG. 14) may transmit RS of the SCell, the RS of the SCell configured to support UE synchronization with the SCell based at least in part on an offset between the RS of the SCell and a reference time of the PCell, the reference time based at least in part on the synchronization with the PCell, as described above.

As further shown in FIG. 12, in some aspects, process 1200 may include communicating via the SCell based at least in part on the synchronization with the SCell (block 1240). For example, the network node (e.g., using communication manager 150 and/or reception component 1402 transmission component 1404, and/or communication manager 1408, depicted in FIG. 14) may communicate via the SCell based at least in part on the synchronization with the SCell, as described above.

Process 1200 may include additional aspects, such as any single aspect or any combination of aspects described below and/or in connection with one or more other processes described elsewhere herein.

In a first aspect, the PCell is associated with a first frequency bandwidth that is lower than a frequency bandwidth of the SCell.

In a second aspect, alone or in combination with the first aspect, transmitting the RS of the SCell comprises transmitting the RS of the SCell via an over-the-air path that includes multiple hops.

In a third aspect, alone or in combination with one or more of the first and second aspects, the reference time of the PCell is based at least in part on a frequency tracking loop of the PCell, or a radio access network time unit of the PCell.

In a fourth aspect, alone or in combination with one or more of the first through third aspects, transmitting the RS of the SCell comprises one or more of transmitting an RS burst transmitted during a synchronization session, or transmitting an RS burst transmitted during a beam management session.

In a fifth aspect, alone or in combination with one or more of the first through fourth aspects, the synchronization session or the beam management session is associated with a frequency-range-specific synchronization session or beam management session, a secondary-cell-specific specific synchronization session or beam management session, or a hop-specific specific synchronization session or beam management session.

In a sixth aspect, alone or in combination with one or more of the first through fifth aspects, process 1200 includes transmitting, via the PCell, a configuration for the synchronization with the SCell.

In a seventh aspect, alone or in combination with one or more of the first through sixth aspects, the configuration schedules the RS of the SCell, or wherein the configuration includes the indication to activate the SCell.

In an eighth aspect, alone or in combination with one or more of the first through seventh aspects, the RS of the SCell is configured to support UE synchronization with the SCell based at least in part on a configured periodicity of synchronizing the SCell, or a trigger event during ongoing communications via the SCell.

In a ninth aspect, alone or in combination with one or more of the first through eighth aspects, process 1200 includes transmitting an indication of the reference time of the PCell.

In a tenth aspect, alone or in combination with one or more of the first through ninth aspects, the reference time of the PCell is based at least in part on one or more of a downlink slot index of the PCell, a symbol within a downlink slot of the PCell, a downlink slot index that carries control information associated with the SCell, a scheduling event on the PCell, or a time unit that is offset, by an indicated amount, from any of the above.

In an eleventh aspect, alone or in combination with one or more of the first through tenth aspects, communicating via the SCell comprises transmitting a scheduling message for a communication using the SCell, that references timing in the PCell, and wherein transmitting the scheduling message comprises transmitting an indication of a first time unit of the PCell, and transmitting an indication of a second time unit of the SCell within the first time unit.

In a twelfth aspect, alone or in combination with one or more of the first through eleventh aspects, process 1200 includes receiving an indication of whether the wireless communication device is synchronized with the SCell.

In a thirteenth aspect, alone or in combination with one or more of the first through twelfth aspects, the indication indicates that the wireless communication device is synchronized with the SCell, and wherein communicating via the SCell is based at least in part on receiving the indication that the wireless communication device is synchronized with the SCell.

In a fourteenth aspect, alone or in combination with one or more of the first through thirteenth aspects, the indication of whether the wireless communication device is synchronized with the SCell applies for a duration of time that expires based at least in part on one or more of a change in a relative channel delay between the PCell and the SCell, a change in a dominant line-of-site path for the SCell or the PCell, a beam switch for the PCell, or a change in a timing tracking loop that satisfies a threshold.

In a fifteenth aspect, alone or in combination with one or more of the first through fourteenth aspects, the wireless communication device comprises a UE, or a forwarding node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
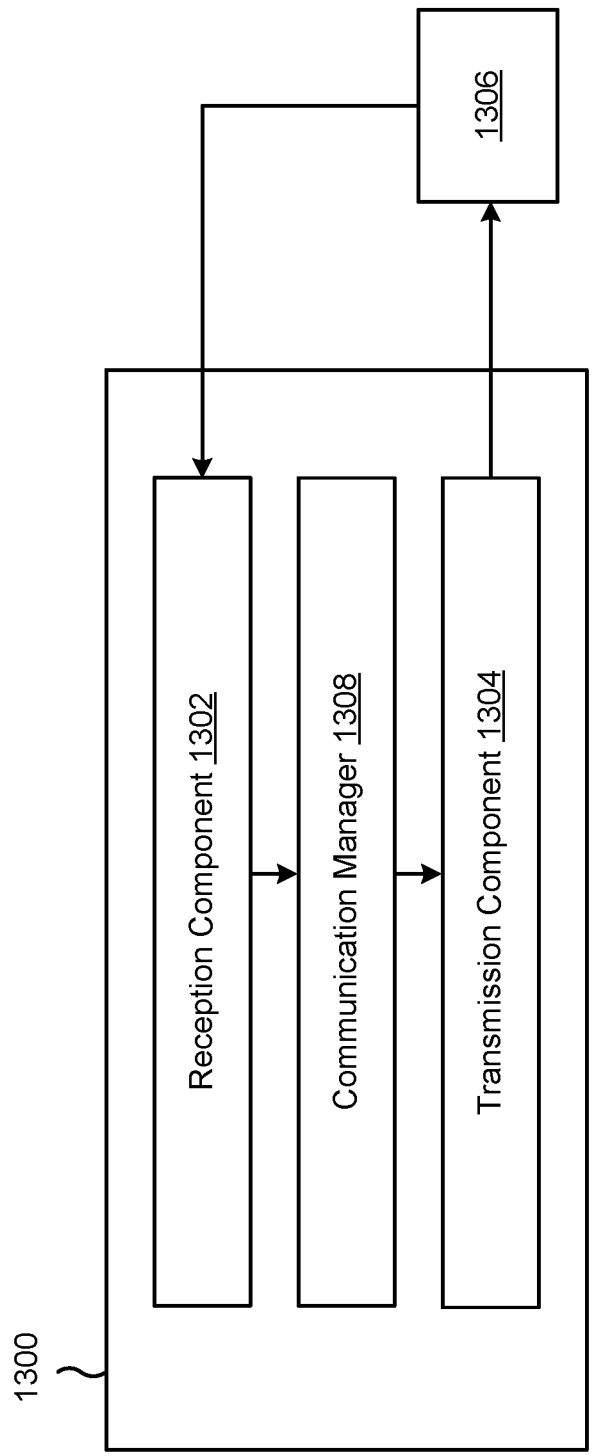
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a wireless communication device, or a wireless communication device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308 (e.g., the communication manager 140 or 150).

In some aspects, the apparatus 1300 may be configured to perform one or more operations described herein in connection with FIGS. 9-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the wireless communication device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the wireless communication device described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the wireless communication device described in connection with FIG. 2. In some aspects, the transmission component 1304 may be co-located with the reception component 1302 in a transceiver.

The communication manager 1308 may obtain synchronization with a PCell of a wireless network. The reception component 1302 may receive an indication to activate an SCell of the wireless network. The reception component 1302 may receive RS of the SCell. The communication manager 1308 may obtain synchronization with the SCell based at least in part on an offset between the RS of the SCell and a reference time of the PCell, the reference time based at least in part on the synchronization with the PCell. The reception component 1302, the transmission component 1304, and/or the communication manager 1308 may communicate via the SCell based at least in part on the synchronization with the SCell.

The reception component 1302 may receive, via the PCell, a configuration for the synchronization with the SCell.

The reception component 1302 may receive an indication of the reference time of the PCell.

The transmission component 1304 may transmit an indication of whether the wireless communication device is synchronized with the SCell.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
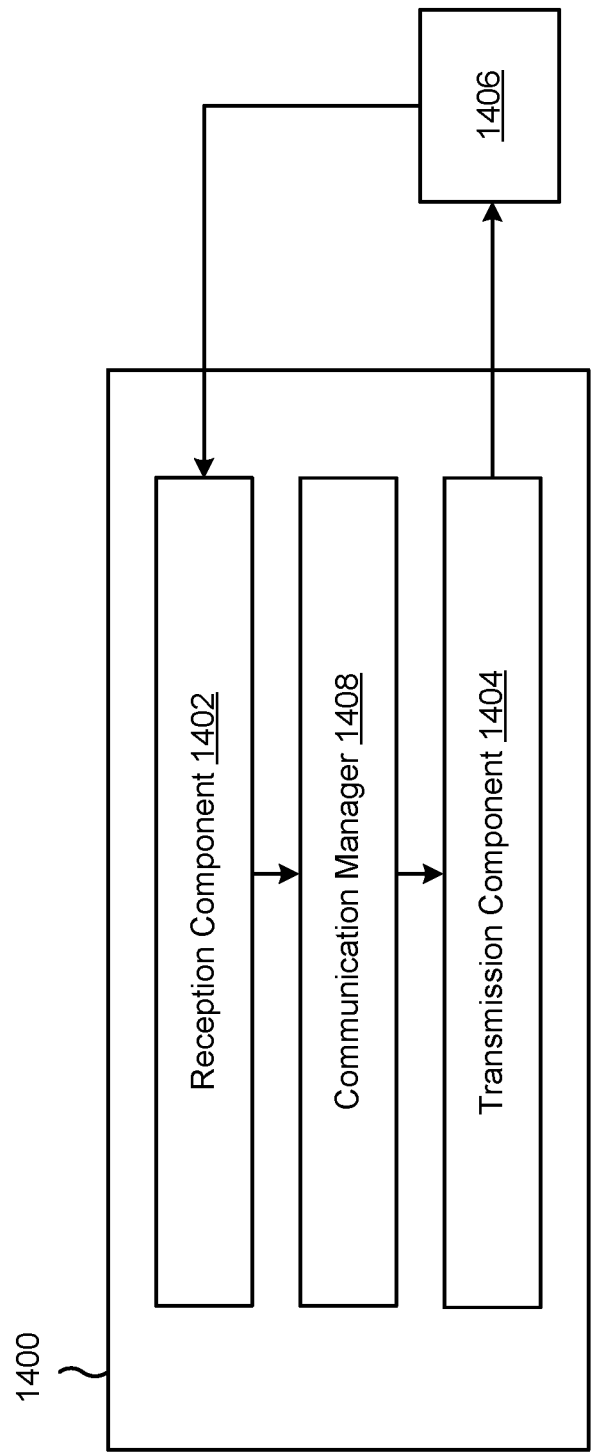
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408 (e.g., the communication manager 150).

In some aspects, the apparatus 1400 may be configured to perform one or more operations described herein in connection with FIGS. 9-10 Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit, to a UE synchronization RSs of a PCell of a wireless network, the RSs of the PCell configured to support synchronization with the PCell. The transmission component 1404 may transmit an indication to activate an SCell of the wireless network. The transmission component 1404 may transmit RS of the SCell, the RS of the SCell configured to support UE synchronization with the SCell based at least in part on an offset between the RS of the SCell and a reference time of the PCell, the reference time based at least in part on the synchronization with the PCell. The reception component 1402 transmission component 1404, and/or communication manager 1408 may communicate via the SCell based at least in part on the synchronization with the SCell.

The transmission component 1404 may transmit, via the PCell, a configuration for the synchronization with the SCell.

The transmission component 1404 may transmit an indication of the reference time of the PCell.

The reception component 1402 may receive an indication of whether the wireless communication device is synchronized with the SCell.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a wireless communication device, comprising: obtaining synchronization with a primary cell of a wireless network; receiving an indication to activate a secondary cell of the wireless network; receiving a reference signal (RS) of the secondary cell; obtaining synchronization with the secondary cell based at least in part on an offset between the RS of the secondary cell and a reference time of the primary cell, the reference time based at least in part on the synchronization with the primary cell; and communicating via the secondary cell based at least in part on the synchronization with the secondary cell.

Aspect 2: The method of Aspect 1, wherein the primary cell is associated with a first frequency bandwidth that is lower than a frequency bandwidth of the secondary cell.

Aspect 3: The method of any of Aspects 1-2, wherein receiving the RS of the secondary cell comprises: receiving the RS of the secondary cell via an over-the-air path that includes multiple hops.

Aspect 4: The method of any of Aspects 1-3, wherein the reference time of the primary cell is based at least in part on: a frequency tracking loop of the primary cell, or a radio access network time unit of the primary cell.

Aspect 5: The method of any of Aspects 1-4, wherein receiving the RS of the secondary cell comprises one or more of: receiving an RS burst received during a synchronization session, or receiving an RS burst received during a beam management session.

Aspect 6: The method of Aspect 5, wherein the synchronization session or the beam management session is associated with: a frequency-range-specific synchronization session or beam management session, a secondary-cell-specific specific synchronization session or beam management session, or a hop-specific specific synchronization session or beam management session.

Aspect 7: The method of any of Aspects 1-6, further comprising: receiving, via the primary cell, a configuration for the synchronization with the secondary cell.

Aspect 8: The method of Aspect 7, wherein the configuration schedules the RS of the secondary cell, or wherein the configuration includes the indication to activate the secondary cell.

Aspect 9: The method of any of Aspects 1-8, wherein obtaining the synchronization with the secondary cell is based at least in part on: a configured periodicity of synchronizing the secondary cell, or a trigger event during ongoing communications via the secondary cell.

Aspect 10: The method of any of Aspects 1-9, further comprising: receiving an indication of the reference time of the primary cell.

Aspect 11: The method of Aspect 10, wherein the reference time of the primary cell is based at least in part on one or more of: a downlink slot index of the primary cell, a symbol within a downlink slot of the primary cell, a downlink slot index that carries control information associated with the secondary cell, a scheduling event on the primary cell, or a time unit that is offset, by an indicated amount, from any of the above.

Aspect 12: The method of any of Aspects 1-11, wherein communicating via the secondary cell comprises receiving a scheduling message for a communication using the secondary cell, that references timing in the primary cell, and wherein receiving the scheduling message comprises: receiving an indication of a first time unit of the primary cell, and receiving an indication of a second time unit of the secondary cell within the first time unit.

Aspect 13: The method of any of Aspects 1-12, further comprising: transmitting an indication of whether the wireless communication device is synchronized with the secondary cell.

Aspect 14: The method of Aspect 13, wherein the indication indicates that the wireless communication device is synchronized with the secondary cell, and wherein communicating via the secondary cell is based at least in part on transmitting the indication that the wireless communication device is synchronized with the secondary cell.

Aspect 15: The method of any of Aspects 13-14, wherein the indication of whether the wireless communication device is synchronized with the secondary cell applies for a duration of time that expires based at least in part on one or more of: a change in a relative channel delay between the primary cell and the secondary cell, a change in a dominant line-of-site path for the secondary cell or the primary cell, a beam switch for the primary cell, or a change in a timing tracking loop that satisfies a threshold.

Aspect 16: The method of any of Aspects 1-15, wherein the wireless communication device comprises: a user equipment (UE), or a forwarding node.

Aspect 17: A method of wireless communication performed by a network node, comprising: transmitting, to a user equipment (UE) synchronization reference signals (RSs) of a primary cell of a wireless network, the RSs of the primary cell configured to support synchronization with the primary cell; transmitting an indication to activate a secondary cell of the wireless network; transmitting a reference signal (RS) of the secondary cell, the RS of the secondary cell configured to support UE synchronization with the secondary cell based at least in part on an offset between the RS of the secondary cell and a reference time of the primary cell, the reference time based at least in part on the synchronization with the primary cell; and communicating via the secondary cell based at least in part on the synchronization with the secondary cell.

Aspect 18: The method of Aspect 17, wherein the primary cell is associated with a first frequency bandwidth that is lower than a frequency bandwidth of the secondary cell.

Aspect 19: The method of any of Aspects 17-18, wherein transmitting the RS of the secondary cell comprises: transmitting the RS of the secondary cell via an over-the-air path that includes multiple hops.

Aspect 20: The method of any of Aspects 17-19, wherein the reference time of the primary cell is based at least in part on: a frequency tracking loop of the primary cell, or a radio access network time unit of the primary cell.

Aspect 21: The method of any of Aspects 17-20, wherein transmitting the RS of the secondary cell comprises one or more of: transmitting an RS burst transmitted during a synchronization session, or transmitting an RS burst transmitted during a beam management session.

Aspect 22: The method of Aspect 21, wherein the synchronization session or the beam management session is associated with: a frequency-range-specific synchronization session or beam management session, a secondary-cell-specific specific synchronization session or beam management session, or a hop-specific specific synchronization session or beam management session.

Aspect 23: The method of any of Aspects 17-22, further comprising: transmitting, via the primary cell, a configuration for the synchronization with the secondary cell.

Aspect 24: The method of Aspect 23, wherein the configuration schedules the RS of the secondary cell, or wherein the configuration includes the indication to activate the secondary cell.

Aspect 25: The method of any of Aspects 17-24, wherein the RS of the secondary cell is configured to support UE synchronization with the secondary cell based at least in part on: a configured periodicity of synchronizing the secondary cell, or a trigger event during ongoing communications via the secondary cell.

Aspect 26: The method of any of Aspects 17-25, further comprising: transmitting an indication of the reference time of the primary cell.

Aspect 27: The method of Aspect 26, wherein the reference time of the primary cell is based at least in part on one or more of: a downlink slot index of the primary cell, a symbol within a downlink slot of the primary cell, a downlink slot index that carries control information associated with the secondary cell, a scheduling event on the primary cell, or a time unit that is offset, by an indicated amount, from any of the above.

Aspect 28: The method of any of Aspects 17-27, wherein communicating via the secondary cell comprises transmitting a scheduling message for a communication using the secondary cell, that references timing in the primary cell, and wherein transmitting the scheduling message comprises: transmitting an indication of a first time unit of the primary cell, and transmitting an indication of a second time unit of the secondary cell within the first time unit.

Aspect 29: The method of any of Aspects 17-28, further comprising: receiving an indication of whether the wireless communication device is synchronized with the secondary cell.

Aspect 30: The method of Aspect 29, wherein the indication indicates that the wireless communication device is synchronized with the secondary cell, and wherein communicating via the secondary cell is based at least in part on receiving the indication that the wireless communication device is synchronized with the secondary cell.

Aspect 31: The method of any of Aspects 29-30, wherein the indication of whether the wireless communication device is synchronized with the secondary cell applies for a duration of time that expires based at least in part on one or more of: a change in a relative channel delay between the primary cell and the secondary cell, a change in a dominant line-of-site path for the secondary cell or the primary cell, a beam switch for the primary cell, or a change in a timing tracking loop that satisfies a threshold.

Aspect 32: The method of any of Aspects 17-31, wherein the wireless communication device comprises: a user equipment (UE), or a forwarding node.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
    a memory; and
    one or more processors, coupled to the memory, configured to:
        obtain synchronization with a primary cell of a wireless network;
        receive an indication to activate a secondary cell of the wireless network;
        receive a reference signal (RS) of the secondary cell;
        obtain synchronization with the secondary cell based at least in part on an offset between the RS of the secondary cell and a reference time of the primary cell, the reference time of the primary cell based at least in part on the synchronization with the primary cell, and the reference time of the primary cell based at least in part on a frequency tracking loop of the primary cell; and
        communicate via the secondary cell based at least in part on the synchronization with the secondary cell.

2. The wireless communication device of claim 1, wherein the primary cell is associated with a first frequency bandwidth that is lower than a frequency bandwidth of the secondary cell.

3. The wireless communication device of claim 1, wherein the one or more processors, to receive the RS of the secondary cell, are configured to:
    receive the RS of the secondary cell via an over-the-air path that includes multiple hops.

4. The wireless communication device of claim 1, wherein the reference time of the primary cell is based at least in part on a radio access network time unit of the primary cell.

5. The wireless communication device of claim 1, wherein the one or more processors, to receive the RS of the secondary cell, are configured to:
    receive an RS burst received during a synchronization session, or
    receive an RS burst received during a beam management session.

6. The wireless communication device of claim 5, wherein the synchronization session or the beam management session is associated with:
    a frequency-range-specific synchronization session or beam management session,
    a secondary-cell-specific specific synchronization session or beam management session, or
    a hop-specific specific synchronization session or beam management session.

7. The wireless communication device of claim 1, wherein the one or more processors are further configured to:
    receive, via the primary cell, a configuration for the synchronization with the secondary cell.

8. The wireless communication device of claim 7, wherein the configuration schedules the RS of the secondary cell, or
    wherein the configuration includes the indication to activate the secondary cell.

9. The wireless communication device of claim 1, wherein the one or more processors are configured to obtain the synchronization with the secondary cell based at least in part on:
    a configured periodicity of synchronizing the secondary cell, or
    a trigger event during ongoing communications via the secondary cell.

10. The wireless communication device of claim 1, wherein the one or more processors are further configured to:
    receive an indication of the reference time of the primary cell.

11. The wireless communication device of claim 10, wherein the reference time of the primary cell is based at least in part on one or more of:
    a downlink slot index of the primary cell,
    a symbol within a downlink slot of the primary cell,
    a downlink slot index that carries control information associated with the secondary cell,
    a scheduling event on the primary cell, or
    a time unit that is offset, by an indicated amount, from any of the above.

12. The wireless communication device of claim 1, wherein the one or more processors, to communicate via the secondary cell, are configured to receive a scheduling message for a communication using the secondary cell, that references timing in the primary cell, and
    wherein the one or more processors, to receive the scheduling message, are configured to:
        receive an indication of a first time unit of the primary cell, and
        receive an indication of a second time unit of the secondary cell within the first time unit.

13. The wireless communication device of claim 1, wherein the one or more processors are further configured to:
 transmit an indication of whether the wireless communication device is synchronized with the secondary cell.

14. The wireless communication device of claim 13, wherein the indication indicates that the wireless communication device is synchronized with the secondary cell, and
 wherein communicating via the secondary cell is based at least in part on transmitting the indication that the wireless communication device is synchronized with the secondary cell.

15. The wireless communication device of claim 13, wherein the indication of whether the wireless communication device is synchronized with the secondary cell applies for a duration of time that expires based at least in part on one or more of:
 a change in a relative channel delay between the primary cell and the secondary cell,
 a change in a dominant line-of-site path for the secondary cell or the primary cell,
 a beam switch for the primary cell, or
 a change in a timing tracking loop that satisfies a threshold.

16. The wireless communication device of claim 1, wherein the wireless communication device comprises:
 a user equipment (UE), or
 a forwarding node.

17. A network node for wireless communication, comprising:
 a memory; and
 one or more processors, coupled to the memory, configured to:
  transmit, to a user equipment (UE) synchronization reference signals (RSs) of a primary cell of a wireless network, the RSs of the primary cell configured to support synchronization with the primary cell;
  transmit an indication to activate a secondary cell of the wireless network;
  transmit an RS of the secondary cell, the RS of the secondary cell configured to support UE synchronization with the secondary cell based at least in part on an offset between the RS of the secondary cell and a reference time of the primary cell, the reference time of the primary cell based at least in part on the synchronization with the primary cell, and the reference time of the primary cell based at least in part on a frequency tracking loop of the primary cell; and
  communicate via the secondary cell based at least in part on the synchronization with the secondary cell.

18. The network node of claim 17, wherein the reference time of the primary cell is based at least in part on a radio access network time unit of the primary cell.

19. The network node of claim 17, wherein the one or more processors are further configured to:
 transmit, via the primary cell, a configuration for the synchronization with the secondary cell.

20. The network node of claim 19, wherein the configuration schedules the RS of the secondary cell, or
 wherein the configuration includes the indication to activate the secondary cell.

21. The network node of claim 17, wherein the RS of the secondary cell is configured to support UE synchronization with the secondary cell based at least in part on:
 a configured periodicity of synchronizing the secondary cell, or
 a trigger event during ongoing communications via the secondary cell.

22. The network node of claim 17, wherein the one or more processors are further configured to:
 transmit an indication of the reference time of the primary cell.

23. The network node of claim 22, wherein the reference time of the primary cell is based at least in part on one or more of:
 a downlink slot index of the primary cell,
 a symbol within a downlink slot of the primary cell,
 a downlink slot index that carries control information associated with the secondary cell,
 a scheduling event on the primary cell, or
 a time unit that is offset, by an indicated amount, from any of the above.

24. The network node of claim 17, wherein the one or more processors, to communicate via the secondary cell, are configured to transmit a scheduling message for a communication using the secondary cell, that references timing in the primary cell, and
 wherein the one or more processors, to transmit the scheduling message, are configured to:
  transmit an indication of a first time unit of the primary cell, and
  transmit an indication of a second time unit of the secondary cell within the first time unit.

25. The network node of claim 17, wherein the one or more processors are further configured to:
 receive an indication of whether a wireless communication device is synchronized with the secondary cell.

26. The network node of claim 25, wherein the indication indicates that the wireless communication device is synchronized with the secondary cell, and
 wherein communicating via the secondary cell is based at least in part on receiving the indication that the wireless communication device is synchronized with the secondary cell.

27. The network node of claim 26, wherein the indication of whether the wireless communication device is synchronized with the secondary cell applies for a duration of time that expires based at least in part on one or more of:
 a change in a relative channel delay between the primary cell and the secondary cell,
 a change in a dominant line-of-site path for the secondary cell or the primary cell,
 a beam switch for the primary cell, or
 a change in a timing tracking loop that satisfies a threshold.

28. A method of wireless communication performed by a wireless communication device, comprising:
 obtaining synchronization with a primary cell of a wireless network;
 receiving an indication to activate a secondary cell of the wireless network;
 receiving a reference signal (RS) of the secondary cell;
 obtaining synchronization with the secondary cell based at least in part on an offset between the RS of the secondary cell and a reference time of the primary cell, the reference time of the primary cell based at least in part on the synchronization with the primary cell, and the reference time of the primary cell based at least in part on a frequency tracking loop of the primary cell; and
 communicating via the secondary cell based at least in part on the synchronization with the secondary cell.

29. The method of claim 28, wherein the reference time of the primary cell is based at least in part on a radio access network time unit of the primary cell.

30. A method of wireless communication performed by a network node, comprising:
- transmitting, to a user equipment (UE) synchronization reference signals (RSs) of a primary cell of a wireless network, the RSs of the primary cell configured to support synchronization with the primary cell;
- transmitting an indication to activate a secondary cell of the wireless network;
- transmitting an RS of the secondary cell, the RS of the secondary cell configured to support UE synchronization with the secondary cell based at least in part on an offset between the RS of the secondary cell and a reference time of the primary cell, the reference time of the primary cell based at least in part on the synchronization with the primary cell, and the reference time of the primary cell based at least in part on a frequency tracking loop of the primary cell; and
- communicating via the secondary cell based at least in part on the synchronization with the secondary cell.

* * * * *